US012752906B2

(12) United States Patent
Moore et al.

(10) Patent No.: US 12,752,906 B2
(45) Date of Patent: Oct. 6, 2026

(54) DUCTED WING WITH FLAPS

(71) Applicant: Whisper Aero Inc., Crossville, TN (US)

(72) Inventors: Mark Douglass Moore, Crossville, TN (US); Ian Andreas Villa, Crossville, TN (US); Devon Jedamski, Crossville, TN (US); Andrew Stephen Hahn, Yorktown, VA (US); Xiaofan Fei, Bellevue, WA (US); Aaron Timothy Perry, Crossville, TN (US)

(73) Assignee: Whisper Aero Inc., Crossville, TN (US)

( * ) Notice: Subject to any disclaimer, the term of this patent is extended or adjusted under 35 U.S.C. 154(b) by 136 days.

(21) Appl. No.: 18/208,181

(22) Filed: Jun. 9, 2023

(65) Prior Publication Data

US 2024/0002034 A1 Jan. 4, 2024

Related U.S. Application Data

(60) Provisional application No. 63/356,891, filed on Jun. 29, 2022.

(51) Int. Cl.
*B64C 39/04* (2006.01)
*B64C 3/14* (2006.01)
(Continued)

(52) U.S. Cl.
CPC .................. *B64C 3/14* (2013.01); *B64C 9/38* (2013.01); *B64C 29/0066* (2013.01); *B64C 39/04* (2013.01)

(58) Field of Classification Search
CPC .............. B64C 9/34; B64C 39/04; B64C 5/08
See application file for complete search history.

(56) References Cited

U.S. PATENT DOCUMENTS 2,828,603 A 4/1958 Laucher
3,428,244 A 2/1969 Michael
(Continued)

FOREIGN PATENT DOCUMENTS

CN 101484663 A 7/2009
CN 104943851 A 9/2015
(Continued)

OTHER PUBLICATIONS

PCT International Search Report and Written Opinion, PCT Application No. PCT/IB2023/056047, Sep. 8, 2023, 10 pages.
(Continued)

*Primary Examiner* — Timothy D Collins
*Assistant Examiner* — Terri L Filosi
(74) *Attorney, Agent, or Firm* — Banner & Witcoff, Ltd.

(57) ABSTRACT

A ducted wing is configured to be connected to an aircraft. The ducted wing includes an array of integrated jetfoils. Each jetfoil includes a propulsor fan, an upper wing portion, and a lower wing portion that extends past an end of the upper wing portion. Each jetfoil includes a duct formed between the upper wing portion and the lower wing portion where the propulsor is within the duct. Furthermore, each jetfoil may have one or more flaps at the leading edge or the trailing edge of the jetfoil. The jetfoil may have flaps that control either the inlet area or the outlet area of the propulsor fan as well as flaps that control whether the aircraft can operate in one of a plurality of different takeoff modes.

25 Claims, 15 Drawing Sheets

(51) Int. Cl.
*B64C 9/38* (2006.01)
*B64C 29/00* (2006.01)

(56) References Cited

U.S. PATENT DOCUMENTS

| | | | |
|---|---|---|---|
| 3,747,343 | A | 7/1973 | Rosen |
| 3,807,639 | A | 4/1974 | Soligny et al. |
| 4,047,840 | A | 9/1977 | Ravenhall et al. |
| 4,205,813 | A | 6/1980 | Evans et al. |
| 4,505,443 | A | 3/1985 | Bradfield et al. |
| 4,813,607 | A | 3/1989 | Hill et al. |
| 5,037,273 | A | 8/1991 | Krueger et al. |
| 5,038,559 | A | 8/1991 | Blackmore |
| 5,115,996 | A | 5/1992 | Moller |
| 5,165,227 | A | 11/1992 | Grieb |
| 5,263,823 | A | 11/1993 | Cabaret et al. |
| 10,724,472 | B1 | 7/2020 | Chase |
| 10,787,254 | B1 | 9/2020 | Chen |
| 11,396,888 | B1 * | 7/2022 | Musgrave ............... F01D 9/048 |
| 11,597,509 | B1 | 3/2023 | Alfaro |
| 11,802,485 | B2 | 10/2023 | Moore et al. |
| 12,000,309 | B2 | 6/2024 | Moore et al. |
| 12,420,936 | B2 | 9/2025 | Gusman et al. |
| 2007/0086889 | A1 | 4/2007 | Matheny |
| 2008/0016872 | A1 | 1/2008 | Toffan et al. |
| 2008/0245925 | A1 | 10/2008 | Udall |
| 2009/0317246 | A1 | 12/2009 | Lutz et al. |
| 2010/0111685 | A1 | 5/2010 | Sjunnesson et al. |
| 2013/0062455 | A1 | 3/2013 | Lugg et al. |
| 2014/0271207 | A1 | 9/2014 | Drane |
| 2014/0321968 | A1 | 10/2014 | Kreitmair-Steck |
| 2016/0363050 | A1 | 12/2016 | Joshi et al. |
| 2017/0009656 | A1 | 1/2017 | Vessot et al. |
| 2017/0203839 | A1 | 7/2017 | Giannini et al. |
| 2018/0281931 | A1 | 10/2018 | Miller et al. |
| 2019/0100303 | A1 | 4/2019 | Campbell |
| 2019/0176971 | A1 | 6/2019 | Cheung et al. |
| 2019/0217937 | A1 | 7/2019 | Wiegand |
| 2020/0047896 | A1 | 2/2020 | Dierksmeier |
| 2021/0107664 | A1 | 4/2021 | Rabbi et al. |
| 2022/0073199 | A1 | 3/2022 | Vondrell et al. |
| 2022/0266979 | A1 | 8/2022 | Bansal et al. |
| 2022/0281594 | A1 | 9/2022 | Ochoa De Eribe Martínez et al. |
| 2022/0348320 | A1 * | 11/2022 | Van Der Meer ....... B64D 27/31 |
| 2023/0086655 | A1 | 3/2023 | Wang |
| 2024/0002034 | A1 | 1/2024 | Moore et al. |

FOREIGN PATENT DOCUMENTS

| | | | |
|---|---|---|---|
| CN | 206344647 | U | 7/2017 |
| CN | 109996725 | A | 7/2019 |
| CN | 111194291 | A | 5/2020 |
| CN | 111237084 | A | 6/2020 |
| CN | 113291459 | A | 8/2021 |
| CN | 113859517 | A | 12/2021 |
| FR | 3087824 | A1 | 5/2020 |
| GB | 938123 | A | 10/1963 |
| JP | 2016075248 | A | 5/2016 |
| WO | WO 2015/128563 | A1 | 9/2015 |
| WO | 2020084221 | A1 | 4/2020 |
| WO | 2020227837 | A1 | 11/2020 |
| WO | 2024010834 | A1 | 1/2024 |

OTHER PUBLICATIONS

PCT International Search Report and Written Opinion, PCT Application No. PCT/IB2022/051659, May 26, 2022, 9 pages.

PCT International Search Report and Written Opinion, PCT Application No. PCT/IB2022/051656, May 26, 2022, 9 pages.

PCT International Search Report and Written Opinion, PCT Application No. PCT/IB2022/051653, May 26, 2022, 9 pages.

United States Office Action, U.S. Appl. No. 17/679,502, filed Oct. 3, 2022, 18 pages.

Aug. 14, 2025—(WO) International Search Report and Written Opinion—App PCT/US2025/031744.

"This Over-Wing Engine Setup Helped Boeing's YC-14 Master Short Runways" [https://www.jalopnik.com/1964717/boeing-yc-14-over-wing-engine-design/] Last accessed Sep. 22, 2022.

"Pioneering concepts for Personal Air Transport Systems." Onera. Retrieved from [http://www.nianet.org/ODM/ODM%20Wednesday%20presentations%20Final/13%20LeTallec%20ONERA.pdf] on Oct. 23, 2024.

Lilium Jet air taxis close to take off | CNN, https://www.cnn.com/travel/article/lilium-electric-vtol-jet/index.html, retrieved May 29, 2025, 8 pages.

Lilium Jet—Wikipedia, https://en.wikipedia.org/wiki/Lilium_Jet, retrieved May 29, 2025, 4 pages.

Five seater self-flying air taxi unveiled, https://www.bbc.com/news/business-48297440, retrieved May 29, 2025, 4 pages.

ECO-150 | ESAero—Empirical Systems Aerospace, https://www.esaero.com/core-technology-innovations/eco-150, retrieved May 29, 2025, 3 pages.

Blown flap—Wikipedia, https://en.wikipedia.org/wiki/Blown_flap, retrieved May 29, 2025, 6 pages.

Marte et al., "A Review of Aerodynamic Noise from Propellers, Rotors and Lift Fans", Jan. 1970; Jet Propulsion Laboratory, California Institute of Technology, Technical Report 32-1462 (Year: 1970).

Eichenbert et al., "Development of a 32 Inch Diameter Levitated Ducted Fan Conceptual Design", Dec. 2006, NASA, TM-2006-214481. (Year: 2006).

Tracy, Ian, "Propeller Design and Analysis for a Small, Autonomous UAV", Jun. 2011, Massachusetts Institute of Technology. (Year: 2011).

* cited by examiner

DUCTED WING WITH FLAPS

CROSS-REFERENCE TO RELATED APPLICATION

This application claims the benefit of U.S. Provisional Patent application No. 63/356,891 filed on Jun. 29, 2022, which is incorporated by reference in its entirety.

BACKGROUND

Field of Technology

The present disclosure generally relates to an aircraft including an array of propulsor fans. More specifically, the present disclosure generally relates to ducted wings with integrated electric ducted fans that allow for variable modes of airflow for conventional takeoff and landing (CTOL), vertical takeoff and landing (VTOL), and short takeoff and landing (STOL) of the aircraft.

Description of the Related Art

Current electric conventional takeoff and landing jets utilize propulsor fans that typically utilize open rotors and propellers. These types of conventional propulsor fans have reached their acoustic limits. Conventional propulsor include two to five blades that are supported on a single end thereby limiting the blade count to five or less blades. For conventional propulsors to emit sound that is at a frequency that is less perceivable to the human ear, the speed of the fans must be increased. However, conventional propulsors cannot be driven at a higher speed due to being only supported by the single end structure. Furthermore, since conventional propulsor fans are supported only at a single end, the angle of the fan blades may change as the blade fan spins at faster speeds which results in changes in pitch that is audible to the human ear. As a result, traditional conventional takeoff and landing jets increase noise pollution.

SUMMARY

An aircraft with a ducted wing, with an embedded array of jetfoils is disclosed. The aircraft may be configured to carry passengers, cargo, or a combination. Each jetfoil includes a propulsor as well as, in some embodiments, a series of flaps to control the takeoff and landing mode of the aircraft, as well as the area of the inlet and outlet of the propulsors. The array of jetfoils together form a ducted wing. One set of the flaps can control the takeoff and landing mode depending on the set angle of the flaps, allowing for CTOL, VTOL, or STOL depending on the angle of the flaps. Another set of flaps control the inlet and outlet area of the inlet and outlet of the propulsors in order to optimize efficiency across a range of airspeeds. The propulsors are embedded in the leading edge of the ducted wing to minimize the ingestion of boundary layer air. In some embodiments, portions of the ducted wing may be used to carry payloads, such as sensors, equipment, batteries, or fuel.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

FIGS. 1A, 1B, 1C, 1D, 1E, IF, and 1G illustrate different views of an aircraft 100 with ducted wings according to one embodiment. Depending on the orientation of one or more flaps of the ducted wings, the aircraft 100 may operate in one of a plurality of different takeoff and landing modes such as a conventional takeoff and landing (CTOL), a vertical takeoff and landing (VTOL) mode, and a short takeoff and landing (STOL) mode as will be further be described below.

Figure 1A:
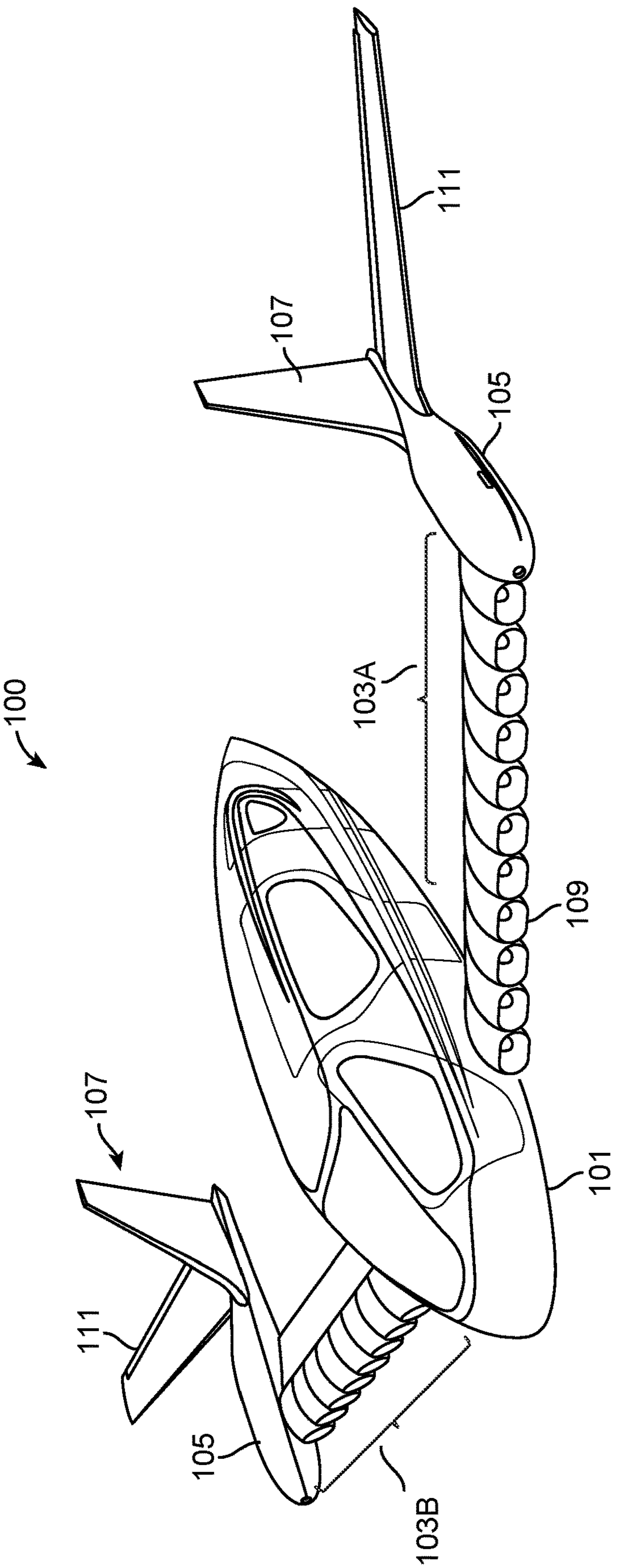
FIG. 1A illustrates a top-front-left perspective view of an aircraft with a ducted wing according to one embodiment.
Figure 1C:
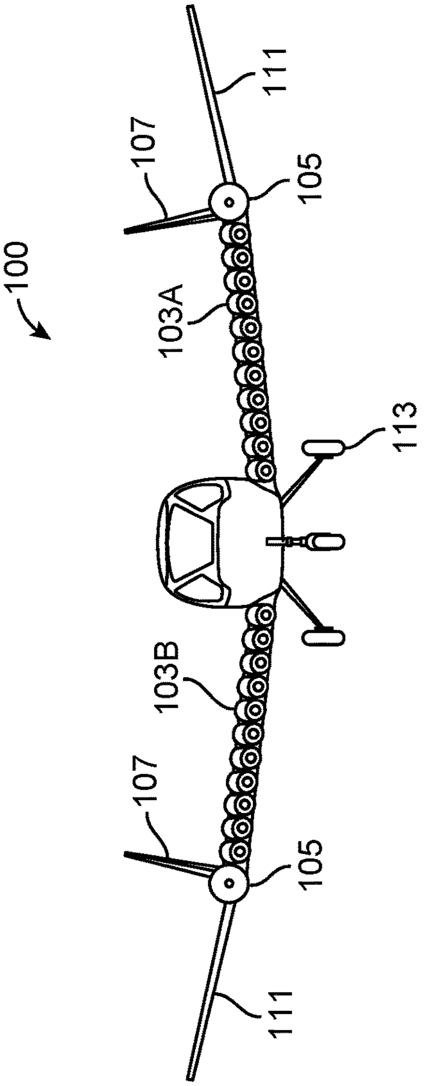
FIGS. 1B, 1C, 1D, 1E, 1F, and 1G respectively illustrate a right-side view of the aircraft with the ducted wing, a front view of the aircraft with the ducted wing, a left-side view of the aircraft with the ducted wing, a rear view of the aircraft with the ducted wing, a bottom view of the aircraft with the ducted wing, and a top view of the aircraft with the ducted wing according to one embodiment.
Figure 1B:
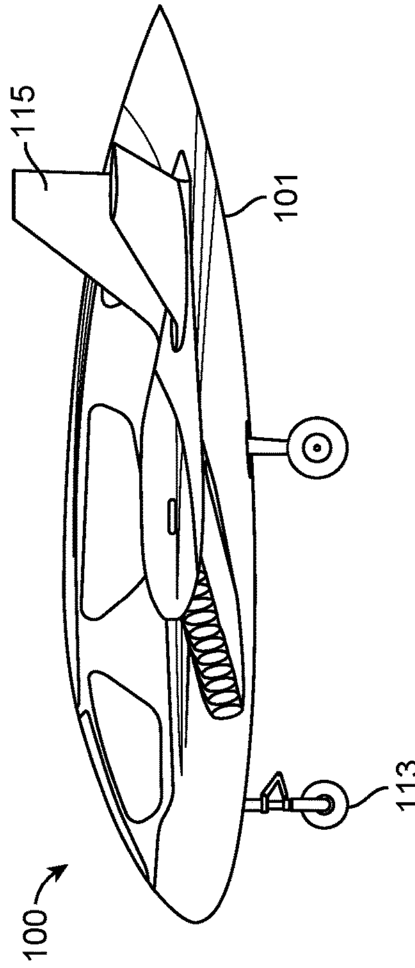
Figure 1D:
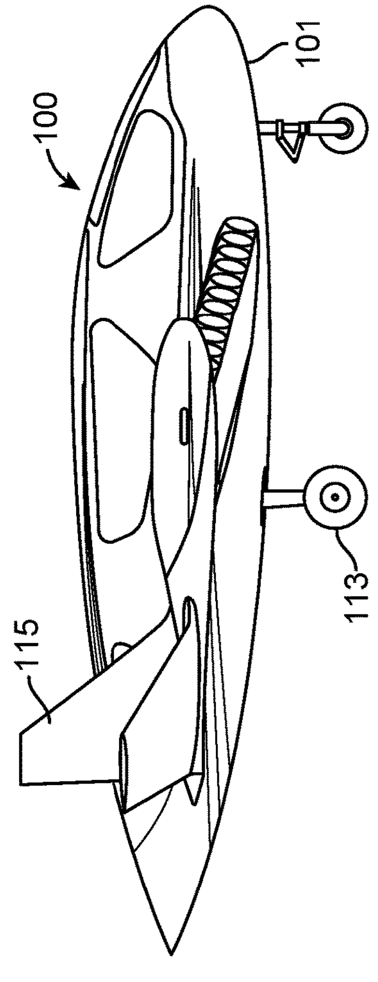
Figure 1F:
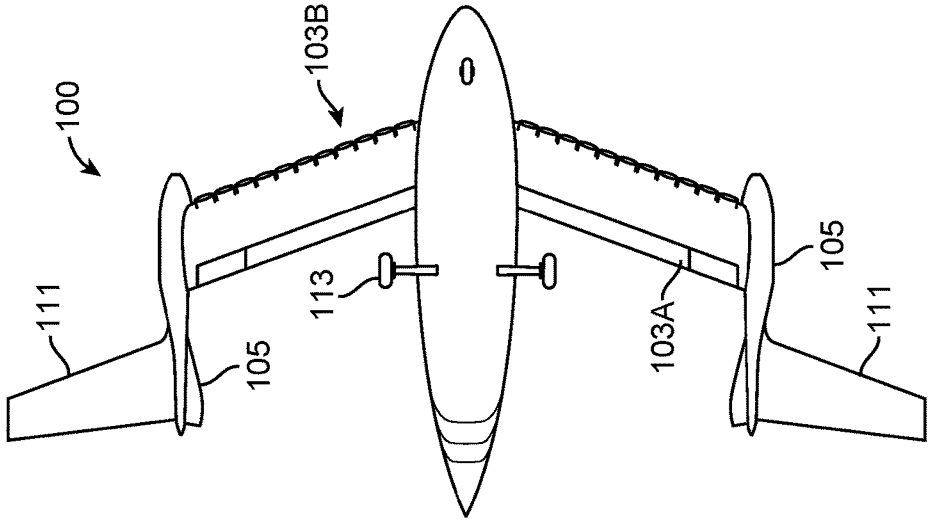
Figure 1E:
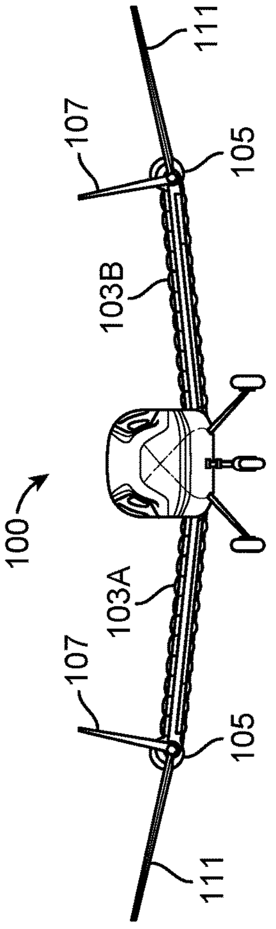
Figure 1G:
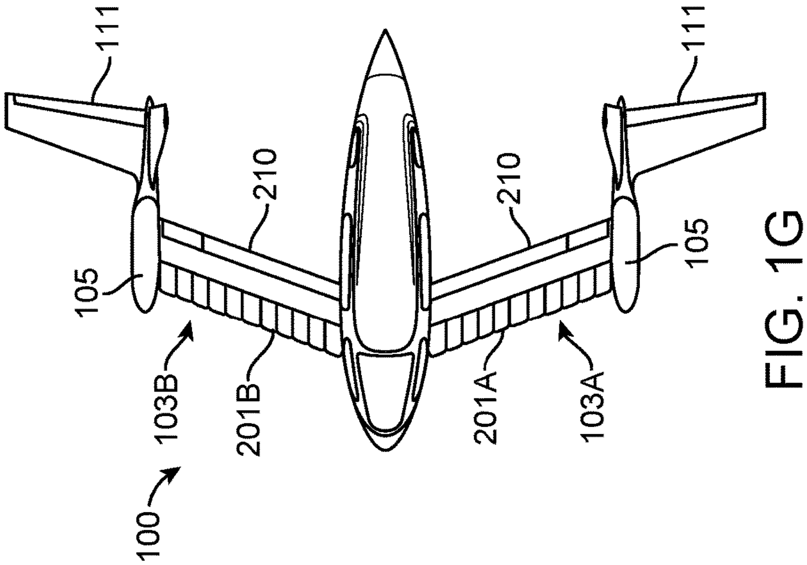

Specifically, FIG. 1A illustrates a top-front-left perspective view of the aircraft 100, FIG. 1B illustrates a right-side view of the aircraft 100 with the ducted wing, FIG. 1C illustrates a front view of the aircraft 100 with the ducted wing, FIG. 1D illustrates a left-side view of the aircraft 100 with the ducted wing, FIG. 1E illustrates a rear view of the aircraft 100 with the ducted wing, FIG. 1F illustrates a bottom view of the aircraft 100 with the ducted wing, and FIG. 1G illustrates a top view of the aircraft 100 with the ducted wing according to an embodiment. In one embodiment, the use of flaps included in the ducted wing allows for the aircraft 100 to transition between CTOL, STOL, and VTOL modes depending on the required application.

Generally, the aircraft 100 may be a regional aircraft capable of carrying passengers and cargo, for example. The aircraft 100 is configured to carry a plurality of passengers such as 5 to 30 plus passengers depending on the configuration of the aircraft 100. In one embodiment, the aircraft 100 is all-electric with a visual flight rules (VFR) range that is less than 200 miles, may be hybrid-electric (using a range extender) to achieve up to 500 miles according to instrument flight rules (IFR), or non-electric for distances greater than 500 miles.

The all-electric aircraft 100 may include a battery pack with a 384-kWh capacity, 255 Whr/kg @ pack level that is liquid cooled, propagation resistant, and quad redundant. The battery pack may include battery cells with a Farasis cylindrical production, 305 Whr/kg @ cell level, 2C discharge/recharge, and 2000 cycle life. The hybrid electric embodiment may use a range extender such as a Rolls-Royce 250 kW turbogenerator.

In one embodiment, the aircraft 100 (e.g., an aircraft) comprises a fuselage 101, a plurality of ducted wings 103, an array of jetfoils 109, a plurality of booms 105, a plurality of horizontal tails 111 (e.g., wings), a plurality of vertical tails 107 (e.g., wings), and one or more landing mechanisms 113. The horizontal tails 111 and vertical tails 107 collectively form empennages of the aircraft 100. Note that in other embodiments, the aircraft 100 may include other components than shown in FIGS. 1A to 1E.

The fuselage 101 is a main body of the aircraft 100. The fuselage 101 is a hollow structure. The fuselage 101 may be one continuous structure or may be a modular structure comprising multiple components that collectively form the fuselage 101. In one embodiment, the fuselage 101 contains one or more payloads. In one embodiment, the aircraft 100 is all-electric. However, the aircraft 100 may utilize a hybrid electric system to enable longer endurance, more payload, and/or longer range in other embodiments as previously described above.

In one embodiment, the fuselage 101 may also comprise electrical components for control of the aircraft 100. Examples of electrical components for controlling the aircraft 100 include one or more controllers such as one or more processors and memory device(s) which are used to control the array of jetfoils 109 and actuate one or more control surfaces of the aircraft 100 (e.g., control of ailerons, rudder, elevator, tabs, flaps, spoilers, slats, etc.).

Figure 2:
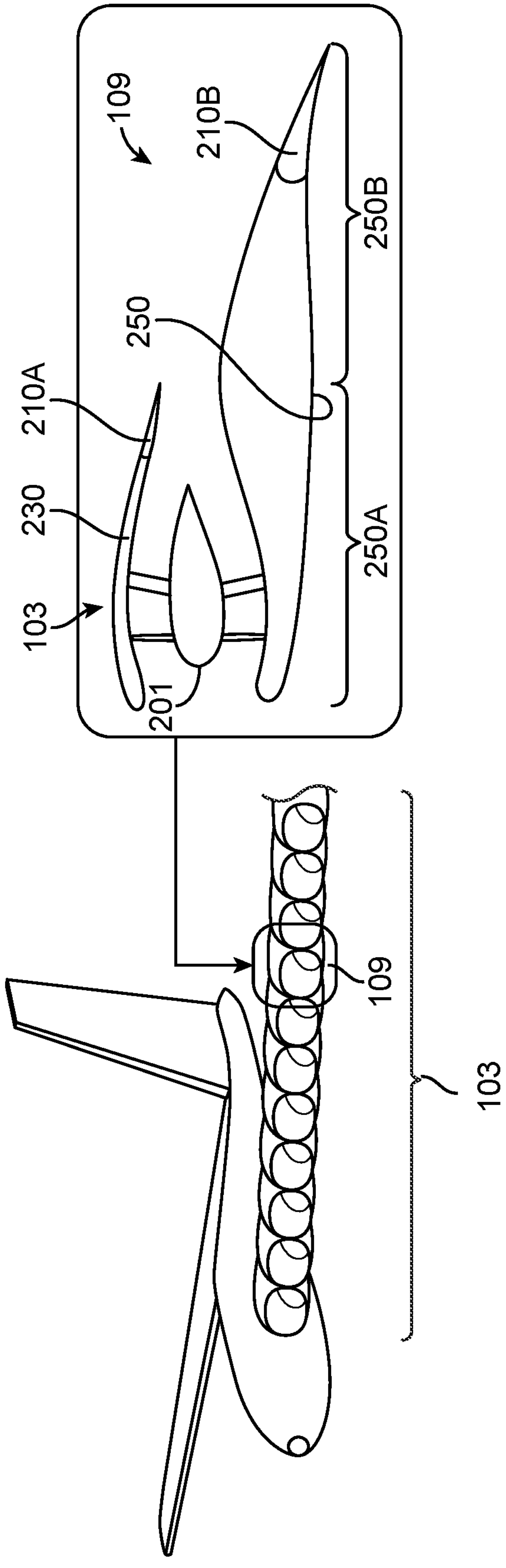
FIG. 2 illustrates a cross-section view of a jetfoil included in the ducted wing according to one embodiment.

The array of jetfoils 109 that is integrated into the ducted wings 103 may include a plurality of propulsors 201 (shown in FIG. 2). In one embodiment, each jetfoil comprises a portion of the ducted wing 103 and a corresponding propulsor 201 within a duct of the jetfoil 109. Each jetfoil 109 is configured to connect to at least one other jetfoil 109 to collectively form the ducted wings 103. An example propulsor 201 is described at U.S. Provisional Patent application No. 63/356,891 filed on Jun. 29, 2022, which is incorporated by reference in its entirety.

In one embodiment, the propulsors 201 are integrated into the leading edge of the ducted wings 103 rather than the trailing edge of the ducted wings 103. Integrating the array of propulsors 201 into the leading edge of the ducted wings 103 rather than the trailing edges of the ducted wings provides a number of advantages. For example, the propulsors 201 have less boundary layer ingestion compared to propulsors located at the trailing edge of the wing and the ducted wings 103 shield people located on the ground from jet noise generated by the propulsors 201 since the trailing edge of the ducted wing 103 functions as a noise shield. Thus, the aircraft 100 reduces noise pollution due to the ducted wing 103. Furthermore, the ducted wing 103 has high lift augmentation from the Coanda effect, less total wetted area than a wing with separate podded propulsors, and reduced inflow distortion at higher angles of attack due to the inlet of the ducted wing 103.

The number of propulsors 201 that are included in the ducted wings 103 is dependent on the application of the aircraft 100. For example, 32 propulsors may be used in the ducted wings 103, but any number of propulsors may be used in other embodiments. The plurality of propulsors 201 may generate 835 kW continuous/1128 kW continuous power with a maximum static thrust of 4465 lb., for example.

One or more landing mechanisms 113 may be attached to a bottom surface of the fuselage 101. The landing mechanisms 113 may be a landing gear (e.g., a tricycle gear) or a landing skid, for example. However, other landing mechanisms 113 may be used in other embodiments.

The ducted wing 103 is the main inboard wing of the aircraft 100. The ducted wing 103 is the central element connecting together the fuselage 101, the booms 105, the horizontal tails 111, and the vertical tails 107. The ducted wing 103 is located between a first end (e.g., a front) and a second end (e.g., a back) of the fuselage 101. The ducted wing 103 is configured to provide lift for the aircraft 100 for flight and has a dihedral with respect to the fuselage 101 to provide for stability in one embodiment. However, in other embodiments the ducted wing 103 may have an anhedral with respect to the fuselage 101. The ducted wing 103 may be made of a composite material such as carbon fiber, metal (e.g., aluminum or titanium), or an alloy.

In one embodiment, the ducted wing 103 includes a first side 103A disposed at a first side of the fuselage 101 (e.g., the right side) and a second side 103B that is disposed at a second side of the fuselage 101 (e.g., the left side). The first side 103A of the ducted wing 103 includes a first plurality of integrated propulsors 201A that are sequentially disposed across the length of the first side 103A of the ducted wing 103. Similarly, the second side 103B of the ducted wing 103 includes a second plurality of integrated propulsors 201B that are sequentially disposed across the length of the second side 103B of the ducted wing 103. The different sets of propulsors 201 integrated in each of the first side 103A and the second side 103B of the ducted wing 103 can be individually controlled. That is, the first plurality of integrated propulsors 201A can be controlled separately from the second plurality of integrated propulsors 201B, for example.

In one embodiment, the first side 103A and the second side 103B of the ducted wing 103 are connected to the bottom surface of the fuselage 101 as shown in FIGS. 1A to 1G. However, the first side 103A and the second side 103B of the ducted wing 103 may be connected to the upper surface of the fuselage 101 in other embodiments which allows for improved ground clearance, passenger ingress/egress, and cargo loading/unloading. As will be further described below, the ducted wing 103 includes one or more control surfaces such as flaps and ailerons to control the aircraft 100 during flight as well as during takeoff and landing.

The first side 103A and the second side 103B of the ducted wing may be configured as one continuous structure that is connected to the bottom surface or upper surface of the fuselage 101 in one embodiment. Alternatively, the first side 103A and the second side 103B of the ducted wing 103 may be separate structures, each coupled to the bottom surface or the upper surface of the fuselage 101.

In one embodiment, the aircraft 100 includes booms 105 that are connected to tips of the ducted wing 103. The main body of each boom 105 extends rearward with respect to the front of the fuselage 101 such that an end of each boom is located before the end of the fuselage 101 as shown in the side views of the aircraft in FIGS. 1B and 1D. The tip of the nose of the boom 105 can be utilized for forward facing camera and sensor systems. Aft of this toroidal volume is space to place primary battery systems. Placing batteries aft of the toroidal volume allows span loading weight tuned to the structural, aero-elastic, and natural harmonic characteristics of the ducted wing 103. Volume in the booms 105 can be utilized for additional sensors (optical, aural, visual, olfactory etc.) as well as navigation lights. The booms 105 also feature an intake for cooling of battery and sensor components.

In one embodiment, the aircraft 100 includes the horizontal tails 111 that are attached to the end of the booms 105. As shown in FIGS. 1A to 1D, the horizontal tails 111 are arranged in an outboard horizontal tail arrangement. That is, each horizontal tail 111 extends in a horizontal direction away from a side surface of the boom 105 that is connected to the horizontal tail 111. The outboard horizontal tail arrangement of the horizontal tails 111 reduces the wetted area for drag and mass reduction as compared to a conventional fuselage mounted horizontal stabilizer. Moving the tails 115 outboard also moves the tails away from the downwash of the array of propulsors 201 that complicates control at low-speed and takeoff.

The horizontal tails 111 affixed at the end of the booms 105 feature elevator surfaces to provide longitudinal stability at all phases of flight. By placing the horizontal tails 111 outboard, the horizontal tails 111 are not in the downwash of the propulsors 201 that complicates control at low-speed and takeoff, necessitating larger variations to trim. Thus, the length of the booms 105 are determined according to air flow modeling that indicates the location of the downwash of the jetfoil 109. Furthermore, the length of the booms 105 are also determined according to the air flow modeling such that the horizontal tails 111 are positioned in an upwash field of the vortex roll-up off of the ducted wing 103 around the boom 105. The effectiveness of the horizontal tails 111 is thus increased as the vortex roll-up provides additional lift. As a result, at cruise conditions, the horizontal tails have a net lift vector pointed towards the forward flight direction, with a positive thrust component thereby reducing battery consumption. In one embodiment, the horizontal tails 111 include roughly a 5-degree dihedral to help with horizontal tip strike during landing of the aircraft 100. The horizontal tails 111 may have flaps that can be actuated with electromechanical actuators, for example.

The vertical tails 107 (e.g., vertical stabilizers) are located at the aft end of the booms 105 on the upper surface of the booms 105 to reduce boom and tail strike concerns. In one embodiment, a single vertical tail is attached to an upper surface of a corresponding boom 105 and extends in an upward direction towards the sky from the upper surface of the boom 105 so that the vertical tail 107 is above the boom 105. Each vertical tail 107 may have a movable control surface such as rudder that enables yaw control. The movable control surfaces of the vertical tails 107 pivot about an end that is connected to the portion of the vertical tail 107 to keep the aircraft 100 in line with the direction of motion of the aircraft 100. To change the direction of motion (e.g., yaw control) of the aircraft 100, the movable control surface may move (e.g., pivot). Vortex roll up off the booms 105 also aids in the effectiveness of the vertical tails 107. Further aerodynamic optimization of the vortex roll-up can allow the vertical tails 107 to be undersized (tail volume coefficients) relative to more conventional aircraft designs while maintaining similar or better performance.

FIG. 2 illustrates a cross-section view of a jetfoil 109 from the array of jetfoils 109 that is integrated into the ducted wing 103 according to one embodiment. By directly integrating the duct into the airfoil leading edge to form the ducted wing 103, duct drag, and weight is minimized while providing minimum fan inflow distortion for lowest noise. The ducted wing 103 aligns the airflow and voids the need for high lift slats. In one embodiment, each jetfoil 109 includes propulsor 201 that is configured to generate thrust, an upper wing portion 230, lower wing portion 250, and one or more flaps 210.

In one embodiment, the upper wing portion 230 of a jetfoil 109 comprises the upper half of the duct that is included in the jetfoil 109. The upper wing portion 230 is configured to control the exhaust flow of the propulsor 201. The lower wing portion 250 is configured to control the different takeoff and landing modes of the aircraft 100. The lower wing portion 250 includes a first lower wing portion 250A at the leading edge of the lower wing portion 250 and extends to a location that is aligned with the aft end of the upper wing portion 230. In some embodiments, the lower wing portion 250 may include a flap configured to pivot between different angles in which specific angles may be associated with specific takeoff and landing modes. For example, one angle of the flap may be associated with a conventional takeoff and landing mode, another angle of the flap may be associated with a vertical takeoff and landing mode, and yet another angle may be associated with a short takeoff and landing mode.

The lower wing portion 250A overlaps the upper wing portion 230 and is connected to the upper wing portion 230. The upper wing portion 230 and the first lower wing portion 250A collectively form the integrated duct of the jetfoil 109. The propulsor 201 is disposed between the upper wing portion 230 of the jetfoil 109 and the first lower wing portion 250A of the lower wing portion 250.

The lower wing portion 250 also includes a second lower wing portion 250B. The second lower wing portion 250B extends from the end of the first lower wing portion 250A to the trailing edge of the lower wing portion 250. As shown in FIG. 2, the second lower wing portion 250B is non-overlapping with the upper wing portion 230.

In one embodiment, one or more flaps 210 are connected to the upper wing portion 230 and the lower wing portion 250. In one embodiment, flaps 210 include a first flap 210A configured to be attached to the upper wing portion 230 and a second flap 210B configured to be attached to the lower wing portion 250. One end of each flap 210 is configured to be attached to an edge of the ducted wing 103. In one embodiment, one end of one of the flaps 210 is configured to be attached to the trailing edge of the ducted wing 103. In another embodiment, one end of one of the flaps 210 is configured to be attached to the leading edge of the ducted wing 103. Each flap 210 is configured to pivot about the attachment point to the edge of the ducted wing 103. The flap 210 may have a different configuration based on its attachment point.

For example, the second flap 210B is configured to pivot about the attachment point to the trailing edge of the lower wing portion 250 and may be configured to direct the airflow from the propulsors 201 to control the lift and drag. The second flap 210B allows for a plurality of takeoff modes, including VTOL, STOL, and CTOL by controlling the direction of airflow from the propulsors 201. In another example, the first flap 210A is configured to pivot about the attachment point to the trailing edge of the upper wing portion 230 and is configured to control the area of the outlet of the exhaust of the propulsors 201 thereby controlling mass flow conditions for efficient fan operation, and subsequently thrust. In some embodiments, each flap 210 is a single-element flap. In other embodiments, some of the flaps 210 are a multi-element flap.

Furthermore, the ducted wing 103 augments low speed lift from a conventional CLmax of 1.8 to over 6.0. This enables three times higher wing loading but with three times smaller wing area compared to conventional wing designs. Directly integrating the duct into the airfoil leading edge of the ducted wing 103 also has lower drag at high-speed cruise (e.g., greater than 40%) when compared to conventional wing designs. High lift is achieved without adding a high pitching moment. Furthermore, the integration of the duct into the jetfoil leading edge of the ducted wing 103 improves ride quality and enables a low stall speed of 61 knots with less than 3,000 takeoff and landing balanced field length.

The array of jetfoils 109 included in the ducted wing 103 augment lift of the wing across multiple speeds and provide thrust throughout the flight envelope. By embedding the array of jetfoils 109 into the ducted wing 103, drag is reduced while simultaneously maximizing the efficiency of thrust generated. In some embodiments, the ducted wing 103 also includes ailerons for roll control as well as additional flaps for trim across various stages of flight.

Flaps 210, include both first flap 210A at the top trailing edge of the ducted wing 103 (e.g., the upper wing portion 230) as well as the second flap 210B at the bottom trailing edge of the ducted wing 103, can deflect in order to tailor the area ratio of the exhaust to the particular cruising speed and ensure that the propulsor exhaust flow remains attached to the upper surface of the lower wing. Tailoring the area ratio ensures optimal efficiency at all cruise speeds without the need for variable pitch propulsor blades. The deflection of the flaps 210 may automatically be scheduled as a function of the airspeed mechanically or electronically in one embodiment.

Due to the propulsor integration into the leading edge of the ducted wing 103, the upper wing portion 230 and the lower wing portion 250 act like a biplane where the vertical portions of the duct array add to the structural rigidity of the structure. As shown in FIG. 2, the lower wing portion 250 is longer than the upper wing portion 230 such that the lower wing portion 250 extends past the end of the flap 210A that is attached to the upper wing portion 230. The leading-edge integration also ensures that distortion into the propulsor 201 face is reduced across angles of attack and flight speeds. This is significant as integration aft of the leading edge would require additional pylons to avoid boundary layer ingestion, resulting in more drag.

The complexity of the integration results in a ducted wing 103 that features a primary spar and at least two secondary spars for rigidity. The ducted wing 103 may feature as many as 50 propulsors to provide multi-engine redundancy, for example. Each of these propulsors are driven with the same signal(s) from a FADEC (Full Authority Digital Engine Control) so that the pilot can control the thrust across the array of propulsors 201 with a single throttle. Each of the propulsors 201 included in the array of jetfoils 109 is replaceable. The leading edge of the array of propulsors 201 can pivot for maintenance purposes to enable access to maintainers to remove the fan, stators, or electric motor as required. However, the propulsors 201 themselves do not pivot during each of the different takeoff and landing modes. Sweep can be introduced to the ducted wing 103 to co-locate the center of lift with the center of thrust to avoid any nose down pitching moments across the speed regime. Depending on the relative arrangement of the booms and tails to the inboard wing, structural weight benefits may also be realized.

As will be further described below, each duct of the array of jetfoils 109 transitions from an elliptical shape at the inlet lip, to a cylindrical section from the fan face to the stator region, and then into a rectangular cross section that allows the exhaust of the aircraft 100 to form a clean sheet that smoothly attaches to the upper surface of the lower airfoil. The jetfoil 109 is specially designed to balance aero and thrust considerations without introducing pitching moment. Within the duct is a center body which houses an electric motor that drives each propulsor 201. Wiring to the motor is directed through one or more stators for power and active cooling, if required. In some embodiments, the upper wing portion 230 and the lower wing portion 250 may contain one or more payloads, such as electronics, sensors, fuel, cargo, or mechanical elements.

FIGS. 3A to 3F illustrate different views of an example application of the ducted wings 103 of the aircraft 100 according to some embodiments. As shown in FIGS. 3A to 3F, the ducted wings 103 includes a plurality of second flaps 210B which can rotate independently of each other. As shown in FIGS. 3A to 3F, the flaps 210B rotate into a range of positions to allow for a range of takeoff modes.

The combination of the propulsors 201 into an array opens up several control and thrust vectoring opportunities. Thrust can simply be varied between each individual propulsor 201 to induce yawing, rolling, or pitching moments. Relative spanwise pitch differences between the jetfoils 109 can be used to catalyze faster climbs and descents. This can be further augmented with additional control surfaces installed at the trailing edge.

The spanwise combination of ducts within the jetfoils 109 lend themselves well to integration along the wing or even as a biplane wing itself. The array can be arranged and extended as a biplanar wing with sweep, stagger, dihedral and taper to fit system needs. The choice to integrate the array of propulsors 201 as a full biplanar wing is dependent on the amount of thrust (minus drag) required as well as the relative size of the propulsor 201.

Figure 3A:
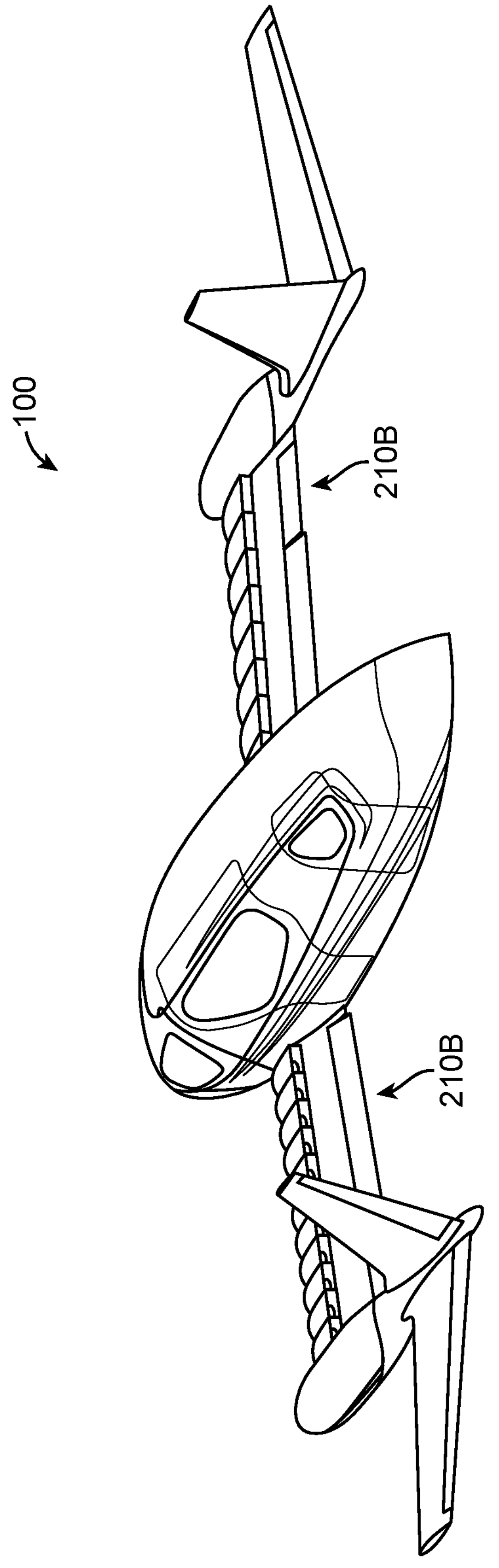
FIGS. 3A, 3B, 3C, 3D, 3E and 3F illustrate various back and side views of the aircraft in which the flaps are set at various angles for different takeoff and landing modes, according to one embodiment.

For example, FIG. 3A illustrates the position of the second flaps 210B on the lower wing portion 250 for CTOL or during the cruise portion of flight. As shown in FIGS. 3A, 3E, and 3F, the second flaps 210B are in a first position (e.g., a first angle) while the aircraft is in the CTOL mode. The first position of the second flaps 210B is optimized for CTOL or cruising during flight. In one embodiment, the default position of the second flaps 210B maximizes the overall length of the ducted wing 103. The second flaps 210B may be controlled independently of other flaps 210, such as first flaps 210A, depending on the embodiment.

Figure 3B:
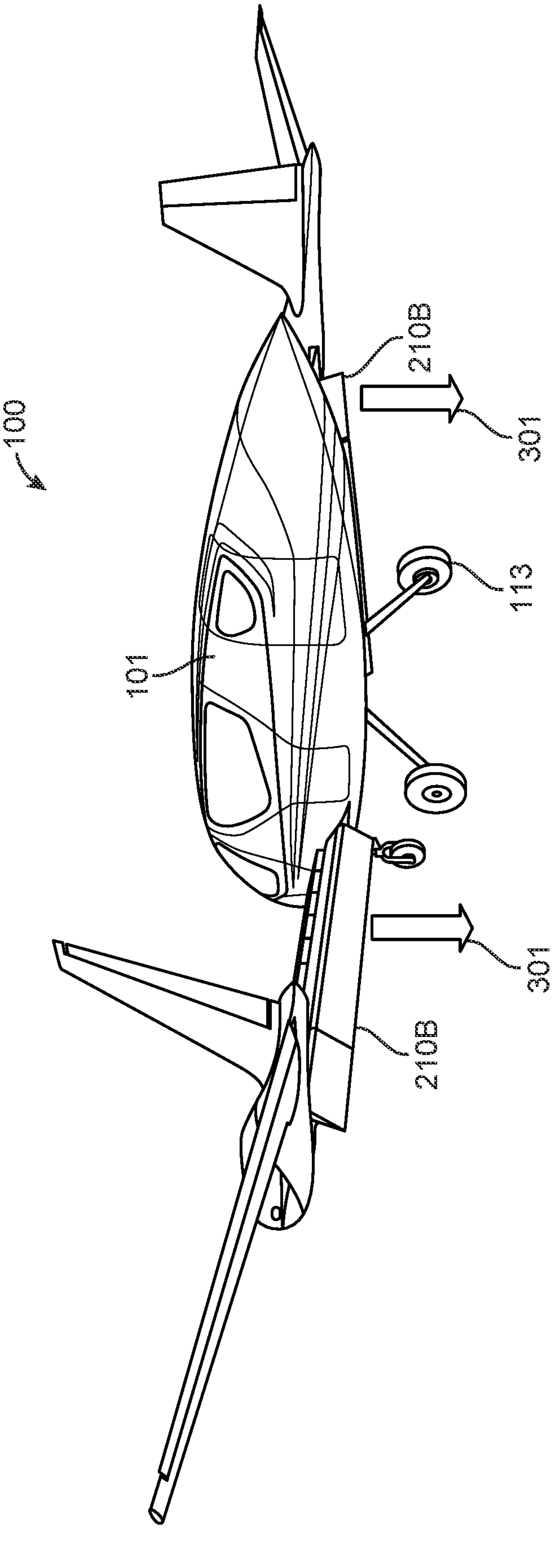

FIG. 3B illustrates a second position of the second flaps 210B on the lower wing portion 250 for VTOL. While the aircraft is in VTOL mode, the second flaps 210B are angled (e.g., pivoted) downward at a maximum angle (e.g., a second angle) of possible pivot of the second flaps 210B to direct the direction of thrust generated by the propulsors 201 in the downward direction as indicated by arrows 301. By directing the thrust downwards, the aircraft 100 is configured for VTOL. In one embodiment, the maximum angle of pivot of the second flaps 210B is a 45-degree angle. If an angle greater than 45 degrees is used, there is a loss in efficiency.

Figure 3C:
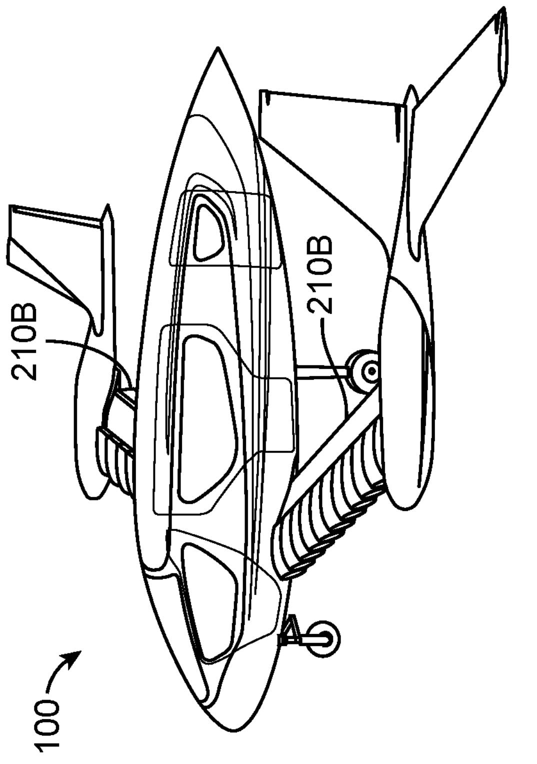
Figure 3D:
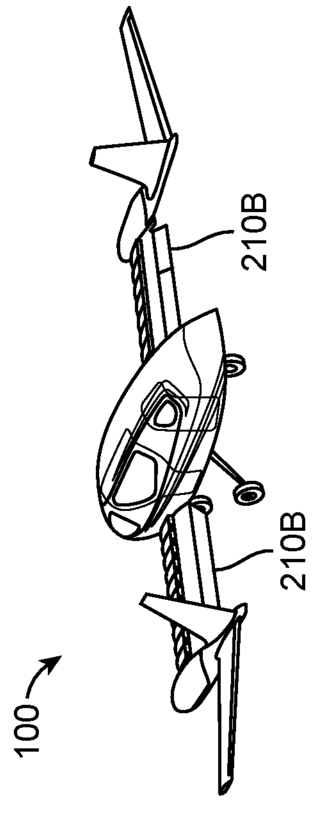
Figure 3E:
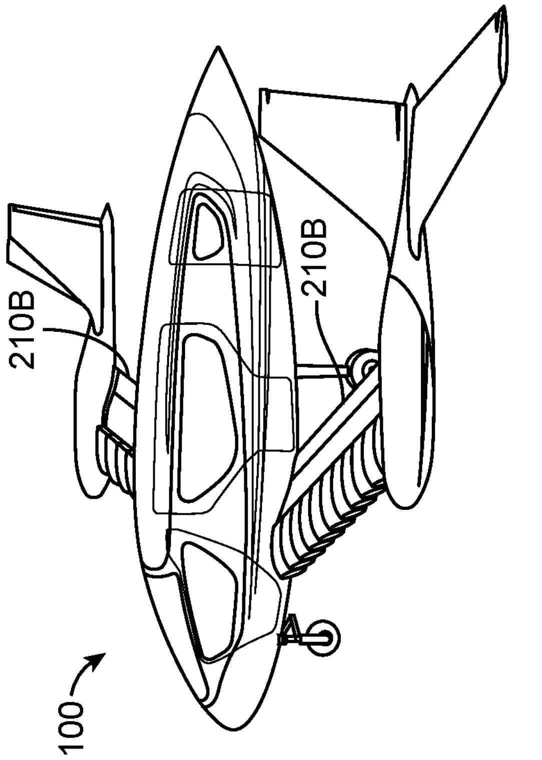
Figure 3F:
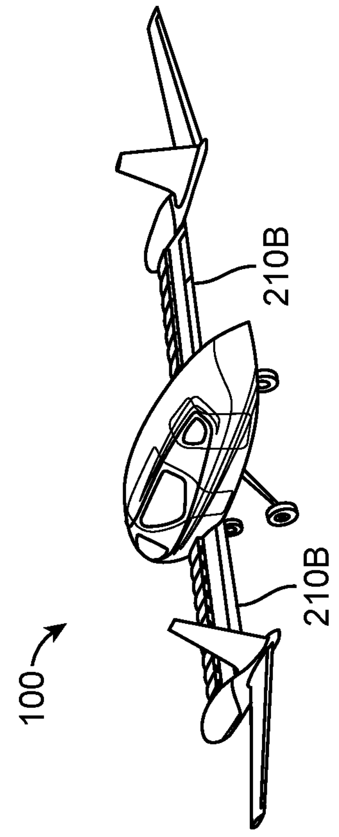

FIGS. 3C and 3D illustrate a third position of the second flaps 210B on the lower wing portion 250 for STOL (e.g. a third angle between the first and second angles of the second flap). In one embodiment, the STOL ability of the aircraft 100 enables the aircraft 100 to take off and clear an obstruction with a predetermined height (e.g., 50 feet) in a predetermined distanced (e.g., 1,500 feet) from the start of the takeoff run and be able to stop within 1,500 feet the predetermined distance after crossing the obstacle. Thus, the aircraft 100 is capable of taking off or landing when the length of the runway or landing area is relatively short.

While in the STOL mode, the second flaps 210B are at the third position which is an intermediate position between the first position of the second flaps 210B for CTOL and the second position of the second flaps 210B for VTOL. In one embodiment, the second flaps 210B are at an intermediate angle between the maximum possible pivot angles of the second flaps 210B for VTOL and the angle of the second flaps 210B for CTOL. FIGS. 3E and 3F illustrate the second flaps 210B on the lower wing portion 250 for CTOL, in the position optimized for CTOL, as a comparison to FIGS. 3C and 3D.

Note that in the CTOL mode, the STOL mode, and VTOL mode, the angle of the propulsors 201 that are integrated into the ducted wing 103 is fixed. That is, the propulsors 201 do not rotate to change the direction of thrust to allow for CTOL, STOL, or VTOL. Rather, the position (e.g., angle) of the second flaps 210B changes to enable each mode of the aircraft 100 and the propulsors 201 maintain a fixed angle during the different modes of the aircraft 100.

Figure 4B:
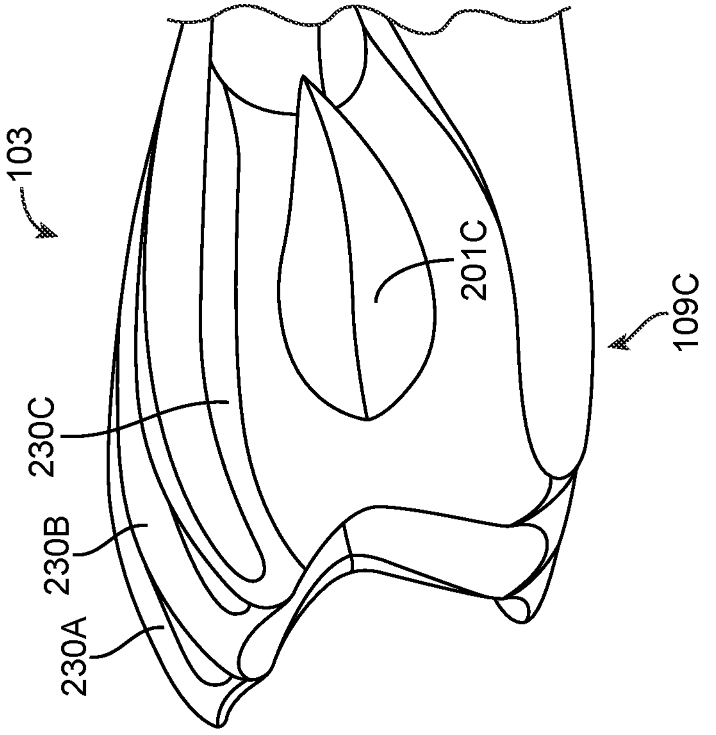
FIGS. 4A and 4B respectively illustrate a perspective view and a side view of an array of jetfoils of the ducted fan according to one embodiment.
Figure 4A:
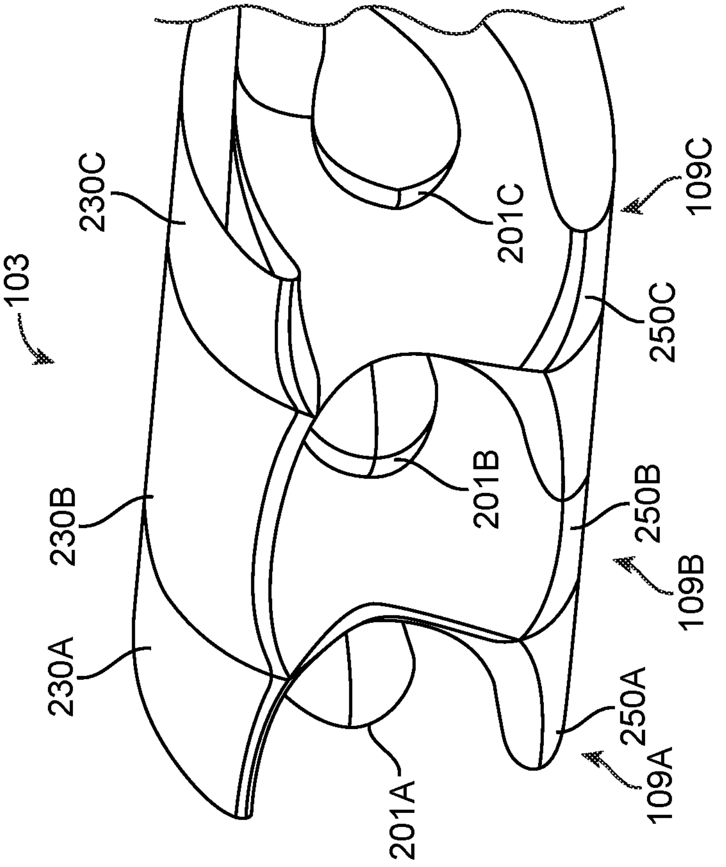

FIGS. 4A and 4B respectively illustrate a perspective view and a cross-section view of an array of jetfoils 109 that form the ducted wing 103 according to one embodiment. FIGS. 4A and 4B illustrate the different jetfoils 109 that collectively make up the ducted wing 103. In one embodiment, the array of jetfoils 109 includes a first jetfoil 109A, a second jetfoil 109B, and a third jetfoil 109C that are laterally arranged to form a portion of the ducted wing 103. The first jetfoil 109A includes a first propulsor 201A, a first upper wing portion 230A, and a first lower wing portion 250A. The second jetfoil 109B includes a second propulsor 201B, a second upper wing portion 230B that is connected to an extends from an end of the first upper wing portion 230A of the first jetfoil 109A, and a second lower wing portion 250B that is connected to an extends from an end of the first lower wing portion 250A of the first jetfoil 109A. Lastly, the third jetfoil 109C includes a third propulsor 201C, a third upper wing portion 230C that is connected to an extends from an end of the second upper wing portion 230B of the second jetfoil 109B, and a third lower wing portion 250C that is connected to an extends from an end of the second lower wing portion 250B of the second jetfoil 109B. While there are three jetfoils 109 shown in FIGS. 4A and 4B, there can be any number of jetfoils in the array of jetfoils 109.

In some embodiments, as shown in FIGS. 4A and 4B, the connections between the first upper wing portion 230A, the second upper wing portion 230B, and the third upper wing portion 230C, as well as between the first lower wing portion 250A, the second lower wing portion 250B, and the third lower wing portion 250C respectively, are curved, rather than straight rectangular lines and edges. In these embodiments, the inlets and outlets of the corresponding propulsor 201 may be more conical in shape, and the flaps 210 which follow those edges may be similarly curved. One benefit of this curve is that it may require less material, and have corresponding weight benefits. In other embodiments not shown, the connections between propulsors 201 may be smoother, leading to a straight-line edge between each of the upper wing portions 230 and lower wing portions 250. In this embodiment, in which the upper wing portion 230 has an edge that is not curved, but instead straight, and the lower wing portion 250 has an edge that is not curved, but instead straight, the airflow over the ducted wing 103 will be more uniform and resemble more of a 2-dimensional flow across the full ducted wing 103. Further, in this embodiment with straighter edges, the corresponding flaps 210 will match the shape of the edges of the upper wing portion 230 and lower wing portion 250.

Figure 5A:
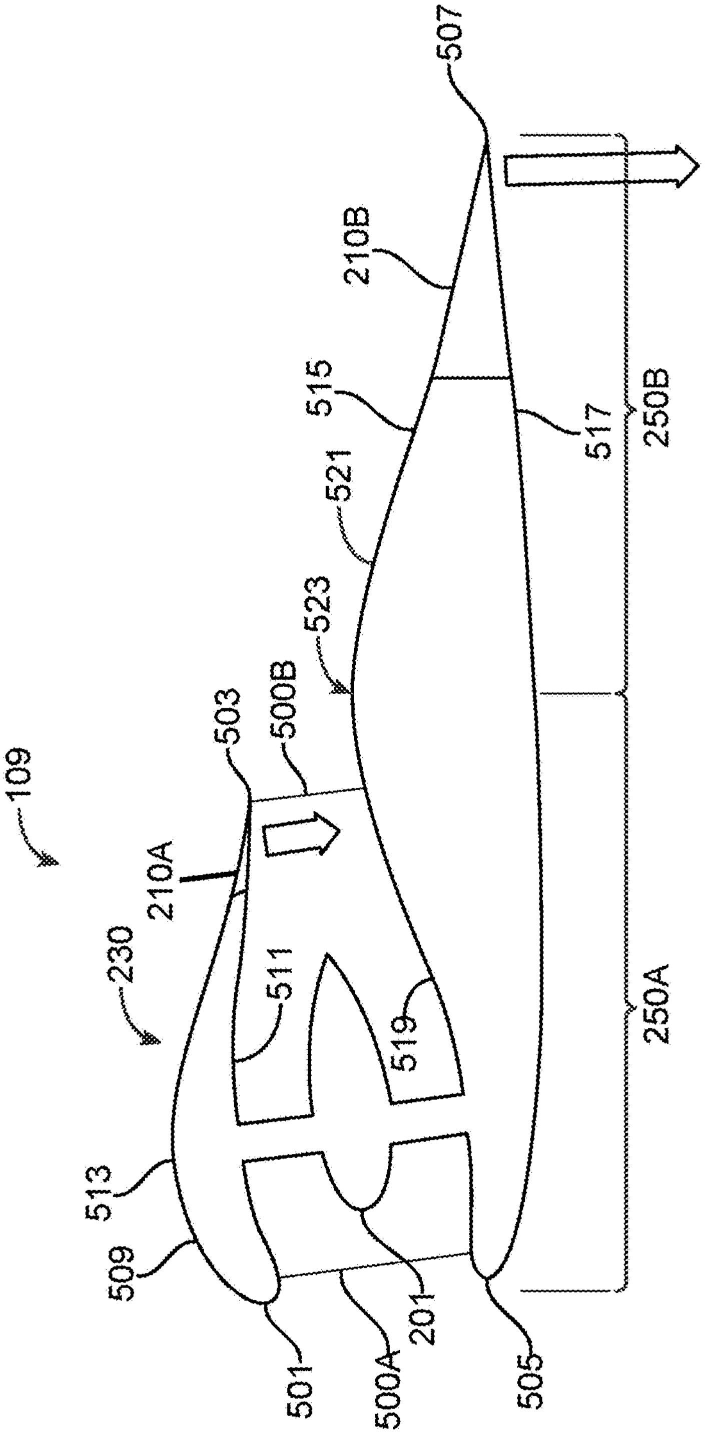
FIGS. 5A, 5B, 5C, and 5D respectively illustrate a cross-section view of the jetfoil of the ducted wing with flaps at the trailing edges of the jetfoil according to a first embodiment, a cross-section view of the jetfoil of the ducted wing with flaps at the trailing edge and a leading edge of the jetfoil according to a second embodiment, a cross-section view of the jetfoil of the ducted wing with flaps at the trailing edges and another leading edge of the jetfoil according to a third embodiment, and a cross-section view of the jetfoil of the ducted wing with flaps at the trailing edges and the leading edges of the jetfoil according to a fourth embodiment.
Figure 5B:
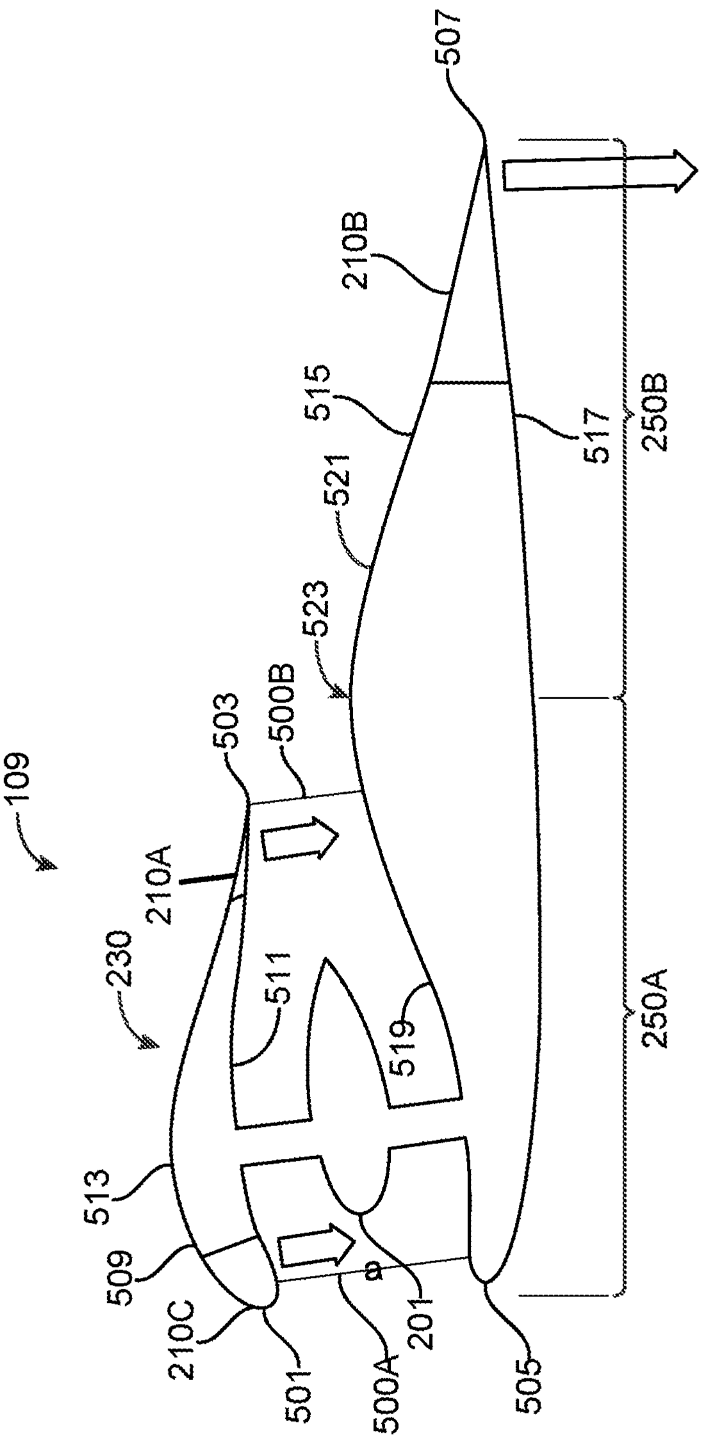
Figure 5C:
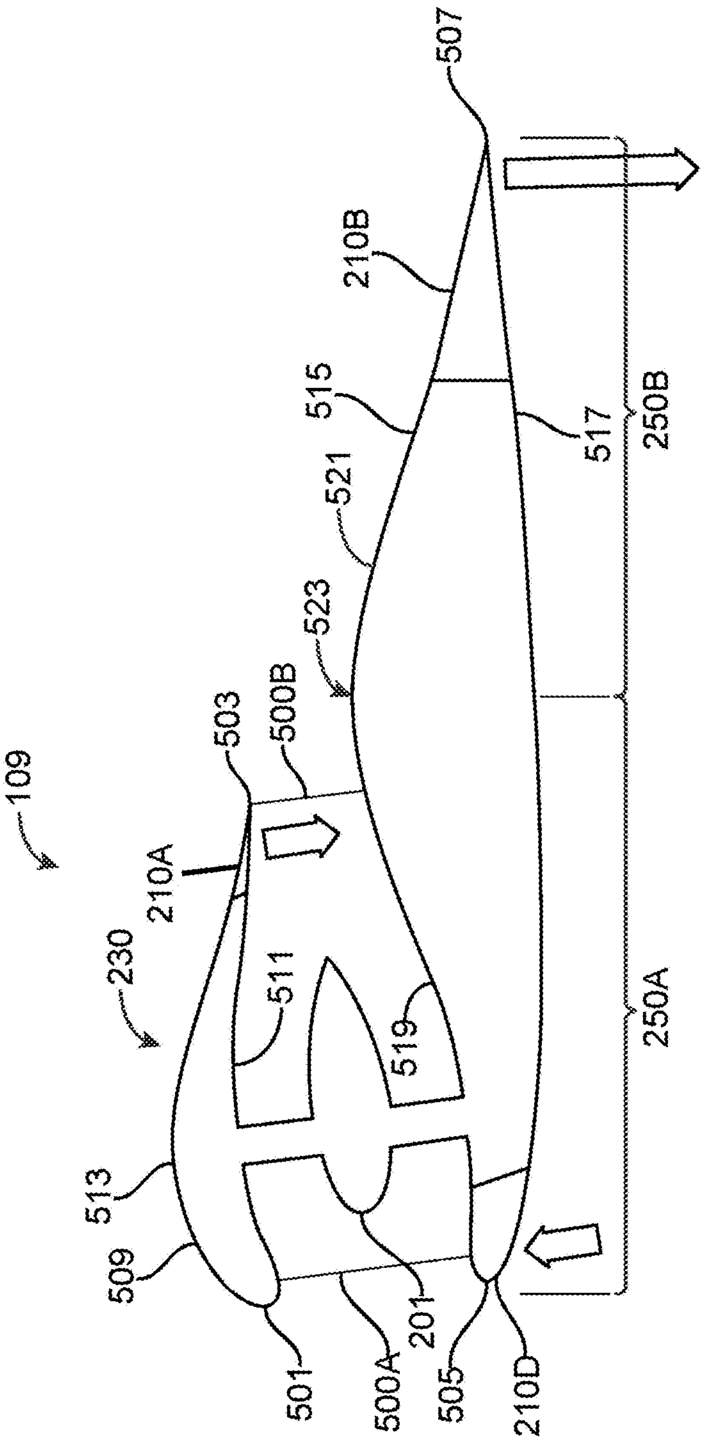
Figure 5D:
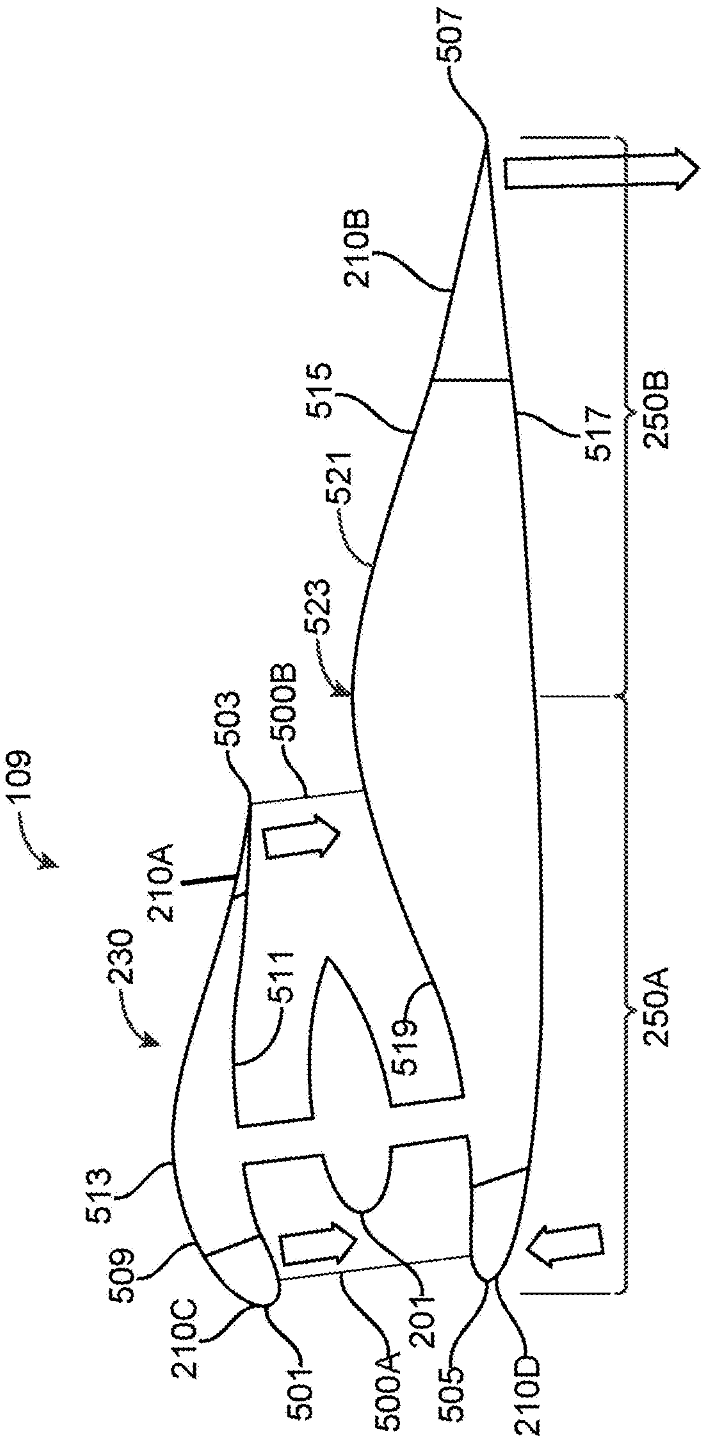

FIGS. 5A to 5D illustrate cross-section views of a jetfoil 109 included in the ducted wing 103 according to some embodiments, with a variety of flap arrangements. Specifically, FIG. 5A illustrates a cross-section view of a jetfoil 109 including the first flap 210A and the second flap 210B as previously described above. FIG. 5B illustrates a cross-section view of a jetfoil 109 also including a third flap 210C in addition to the first flap 210A and the second flap 20B. FIG. 5C illustrates a cross-section view of a jetfoil 109 also including a fourth flap 210D in addition to the first flap 210A and the second flap 20B. FIG. 5D illustrates a cross-section view of a jetfoil 109 including both the third flap 210C and the fourth flap 210D in addition to the first flap 210A and the second flap 20B. Each of the plurality of flaps 210 are controlled independently of each other.

Referring to FIG. 5A, in one embodiment, each jetfoil 109 includes a propulsor 201 with an inlet diameter and an outlet diameter. The jetfoil 109 has an inlet 500A with a corresponding inlet diameter and an outlet 500B with a corresponding outlet diameter with a default position in which the inlet diameter is larger than the outlet diameter.

The upper wing portion 230 includes a first end 501 and a second end 503 that is opposite the first end 501. The lower wing portion 250 also includes a first end 505 and a second end 507 that is opposite the first end 505 of the lower wing portion 250. In one embodiment, each of the first end 501 of the upper wing portion 230 and the first end 505 of the lower wing portion 250 is rounded as shown in FIG. 5A.

In one embodiment, the first end 501 (i.e., leading edge) of the upper wing portion 230 is forward of the first end 505 (i.e., leading edge) of the lower wing portion 250.

That is, the first end 501 of the upper wing portion 230 extends past the first end 505 of the lower wing portion 250 such that the first end 501 of the upper wing portion 230 is non- overlapping with the first end 505 of the lower wing portion 250 in one embodiment. This results in an inlet surface area of the jetfoil 109 which is canted, rather than perpendicular to the flow of air. The canted inlet surface area aids low speed performance and reduces inlet flow field distortion In one embodiment, the upper wing portion 230 has an outer surface 509 that is convex in shape and an inner surface 511 that is concave in shape. The outer surface 509 of the upper wing portion 230 is not parallel with the inner surface 511 of the upper wing portion 230 as shown in FIG. 5A. In one embodiment, the thickness of the upper wing portion 230 varies from the first end 501 of the upper wing portion 230 to the second end 503 of the upper wing portion 230. Specifically, the thickness of the upper wing portion 230 increases from the first end 501 of the upper wing portion 230 to an intermediate portion 513 of the upper wing portion 230 that is between the first end 501 and the second end 503 of the upper wing portion 230. In one embodiment, the intermediate portion 513 corresponds to (e.g., overlaps) the location of the propulsor 201 within the jetfoil 109. Thus, the thickest portion of the upper wing portion 230 is aligned with the propulsor 201 in one embodiment. The thickness of the upper wing portion 230 decreases from the intermediate portion 513 of the upper wing portion 230 to the second end 503 of the upper wing portion 230.

The lower wing portion 250 has an inner surface 515 that faces the inner surface 511 of the upper wing portion 230. The inner surface 515 of the lower wing portion 250 is connected to the inner surface 511 of the upper wing portion 230 to collectively form the inner surface of the duct of the jetfoil 109 in which the propulsor 201 is disposed. The inner surface 515 of the lower wing portion 250 includes a first portion 519 that is concave in shape and a second portion 521 that is convex in shape.

In one embodiment, the concave first portion 519 of the inner surface 515 of the lower wing portion 250 overlaps the concave inner surface 511 of the upper wing portion 230. In one embodiment, the concave first portion 519 of the inner surface 515 of the lower wing portion 250 is included in the first lower wing portion 250A previously described above. The propulsor 201 is disposed between the concave first portion 519 of the inner surface 515 of the lower wing portion 250 and the concave portion of the inner surface 511 of the upper wing portion 230 that form the duct of the jetfoil 109. In one embodiment, the duct formed by the upper wing portion 230 and the lower wing portion 250 has the largest inner diameter in the concave first portion 519 of the inner surface 515 of the lower wing portion 250 and the concave inner surface 511 of the upper wing portion 230 that overlaps the propulsor 201. As shown in FIG. 5A, the propulsor 201 is closer to the inlet 500A than the outlet 500B of the duct.

The convex second portion 521 of the upper inner surface 515 of the lower wing portion 250 is included in the second lower wing portion 250B and is thus non-overlapping with the upper wing portion 230. The lower wing portion 250 also has an outer surface 517. The outer surface 517 of the lower wing portion 250 is convex in shape from the first end 505 of the lower wing portion 250 to the second end 507 of the lower wing portion 250 in one embodiment.

In one embodiment, the thickness of the lower wing portion 250 varies from the first end 505 of the lower wing portion 250 to the second end 507 of the lower wing portion 250. Specifically, the thickness of the lower wing portion 250 increases from the first end 505 of the lower wing portion 250 to an intermediate portion 523 of the lower wing portion 250 that corresponds to (e.g., overlaps) the second end 503 of the upper wing portion 230. Thus, the thickest portion of the lower wing portion 250 is aligned with the second end 503 of the upper wing portion 230. The thickness of the lower wing portion 250 decreases from the intermediate portion 523 of the lower wing portion 250 to the second end 507 of the lower wing portion 250.

As a result of the concave and convex shapes of both of the inner surface 511 of the upper wing portion 230, and the inner surface 515 of the lower wing portion 250, an inner diameter (and therefore the area) of the duct of the jetfoil varies from both of the first end 501 of the upper wing portion 230, and the first end 505 the lower wing portion 250 to the second end 503 of the upper wing portion 230 and the intermediate portion 523 of the lower wing portion 250. As shown in FIG. 5A, the diameter (and therefore the area) of the duct increases from the inlet 500A of the jetfoil to a portion of the duct overlapping the intermediate portion 513 of the upper wing portion, and decreases from the intermediate portion 513 to the outlet 500B of the duct between the second end 503 of the upper wing portion 230 and the intermediate portion 523 of the lower wing portion 250.

As mentioned previously, one or more flaps 210 may be connected to the jetfoil 109. In FIG. 5A, the second end 503 of the upper wing portion 230 includes a first flap 210A and the second end 507 of the lower wing portion 250 includes a second flap 210B. The first flap 210A is configured to control the outlet area of the outlet 500B (e.g., exhaust outlet) of the jetfoil 109. That area of outlet 500B may be decreased from its maximum area to a minimum outlet area by pivoting the first flap 210A downward thereby changing the angle of the first flap 210A, and changing the diameter of the outlet. Control of outlet area of the jetfoil 109 allows for optimized air flow at various speeds of the aircraft 100 and allows for maximum efficiency across various speeds.

In contrast, the second flap 210B controls the direction of the exhaust flow thereby changing the direction of thrust. As mentioned previously, the angle (e.g., position) of the second flap 210B corresponds to a particular mode of the aircraft 100. In FIG. 5A, the angle of the second flap 210B corresponds to the CTOL mode, but the second flap 210B may be angled downwards to a maximum angle corresponding to the VTOL mode of the aircraft 100 or an intermediate angle that corresponds to the STOL mode of the aircraft 100.

FIG. 5B illustrates another embodiment of the jetfoil 109. The embodiment shown in FIG. 5B is similar to the embodiment shown in FIG. 5A. Thus, components common to both the embodiments in FIGS. 5A and 5B are omitted from each description.

In the embodiment of FIG. 5B, a third flap 210C is added to the first end 501 of the upper wing portion 230. Thus, the jetfoil 109 in FIG. 5B includes the first flap 210A at the second end 503 of the upper wing portion 230, the second flap 210B at the second end 507 of the lower wing portion 250, and the third flap 210C at the first end 501 of the upper wing portion 230. The first flap 210A and the second flap 210B perform the same functions described above with respect to FIG. 5A. The third flap 210C may be configured to be positioned at different angles to change the inlet area of the inlet 500A of the jetfoil 109. For example, the angle of the third flap 210C may be changed downward toward a center of the propulsor 201 to control the inlet area of the inlet 500A of the jetfoil 109. Control of the inlet area in addition to the outlet area of the jetfoil 109 further optimizes the inlet airflow at various speeds of the aircraft 100 to maximize efficiency across the various speeds.

FIG. 5C illustrates another embodiment of the jetfoil 109. The embodiment shown in FIG. 5C is similar to the embodiment shown in FIG. 5A. Thus, components common to both the embodiments in FIGS. 5A and 5C are omitted for each of description.

In the embodiment of FIG. 5C, a fourth flap 210D is added to the first end 505 of the lower wing portion 250. Thus, the jetfoil 109 in FIG. 5C includes the first flap 210A at the second end 503 of the upper wing portion 230, the second flap 210B at the second end 507 of the lower wing portion 250, and the fourth flap 210D at the first end 505 of the lower wing portion 250. The first flap 210A and the second flap 210B perform the same functions described above with respect to FIG. 5A. The fourth flap 210D may be configured to be positioned at different angles to change the inlet area of the inlet 500A of the jetfoil 109. For example, the angle of the fourth flap 210D may be changed upward toward a center of the propulsor 201 to control the inlet area of the inlet 500A of the jetfoil 109. Control of the inlet area in addition to the outlet area of the jetfoil 109 further optimizes the inlet airflow at various speeds of the aircraft 100 to maximize efficiency across the various speeds.

FIG. 5D illustrates yet another embodiment of the jetfoil 109. The embodiment shown in FIG. 5D is similar to the embodiments shown in FIGS. 5A to 5C. Thus, components common to both the embodiments in FIG. 5A to 5C are omitted for each description.

In the embodiment of FIG. 5C, the third flap 210C is added to the first end 503 of the upper wing portion 230 and the fourth flap 210D is added to the first end 505 of the lower wing portion 250. Thus, the jetfoil 109 in FIG. 5D includes the first flap 210A at the second end 503 of the upper wing portion 230, the second flap 210B at the second end 507 of the lower wing portion 250, the third flap 210C at the first end 501 of the upper wing portion 230, and the fourth flap 210D at the first end 505 of the lower wing portion 250. The first flap 210A and the second flap 210B perform the same functions described above with respect to FIG. 5A. The third flap 210C and the fourth flap 210D may be configured to be positioned at different angles to change the inlet diameter of the inlet 500A of the jetfoil 109, and therefore change the inlet area of the inlet 500A of the jetfoil 109. By having both the third flap 210C and the fourth flap 210D, the inlet area of the inlet 500A of the jetfoil 109 can be adjusted more compared to the embodiments of FIGS. 5B and 5C with a single flap 210 at the inlet of the jetfoil 109 to further optimize the inlet airflow at various speeds of the aircraft 100.

In one embodiment, the ducted wing 103 may include a control mechanism connected to each flap 210 to control the angle of the flap 210. The control mechanism may include a servo motor and a rod in one embodiment. One end of the rod is connected to the servo motor and a second end of the rod is connected to the flap 210B. The servo motor may extend the rod to pivot the flap 210 towards its maximum possible angle and may retract the rod to return the rod to its default position.

Figure 6A:
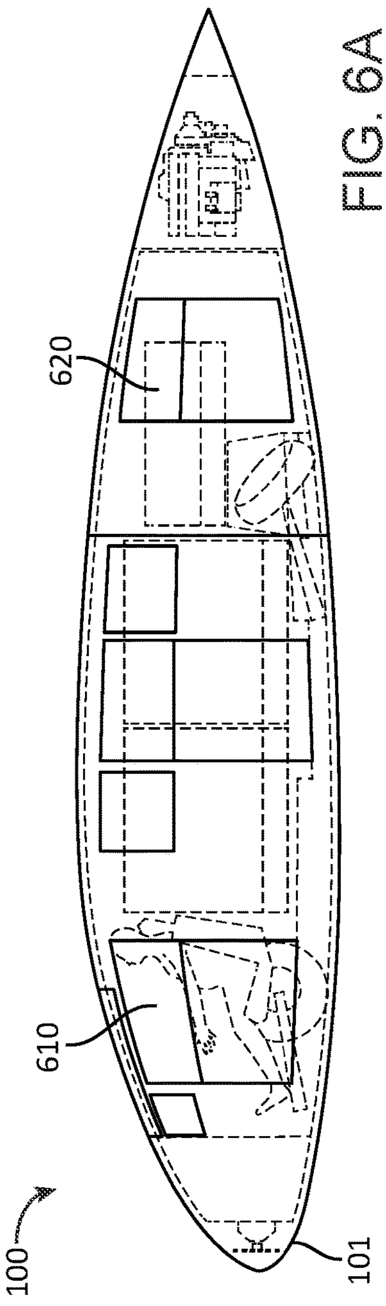
FIGS. 6A, 6B, and 6C illustrate various top and side views of the aircraft configured to carry passengers and cargo according to some embodiment.
Figure 6B:
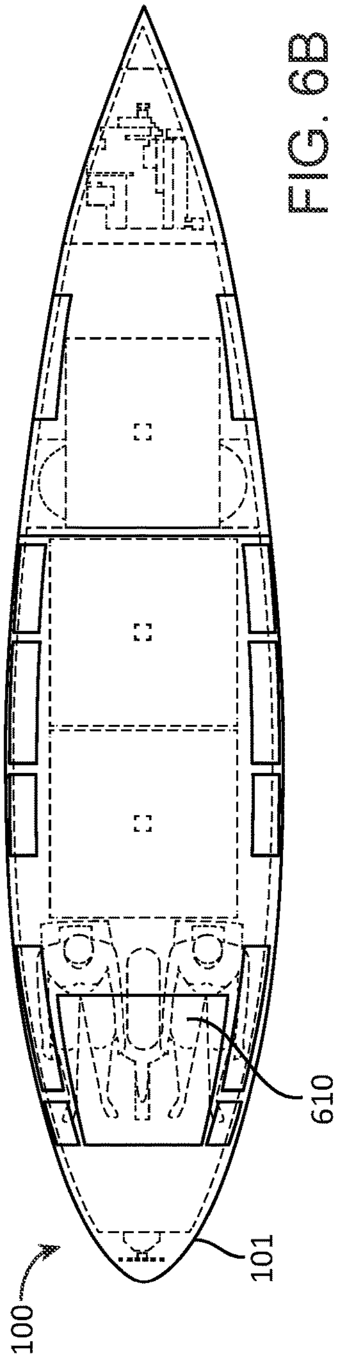
Figure 6C:
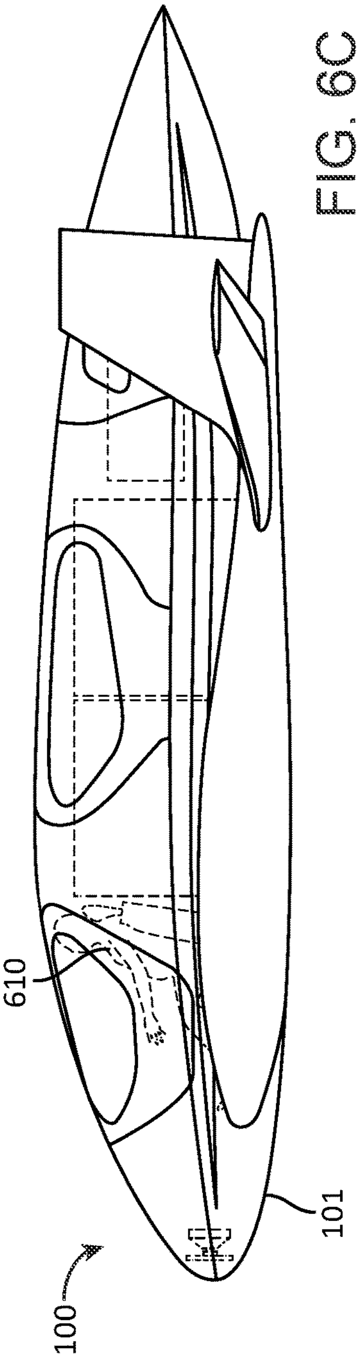
Figure 7A:
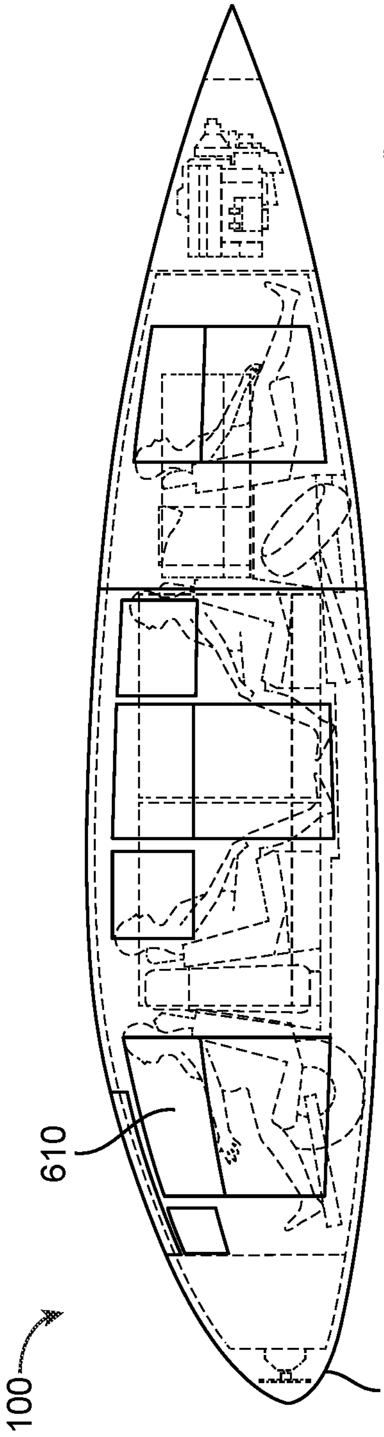
FIGS. 7A, 7B, 7C, 7D, and 7E illustrate top and side views of the aircraft configured to carry passengers according to one embodiment.
Figure 7B:
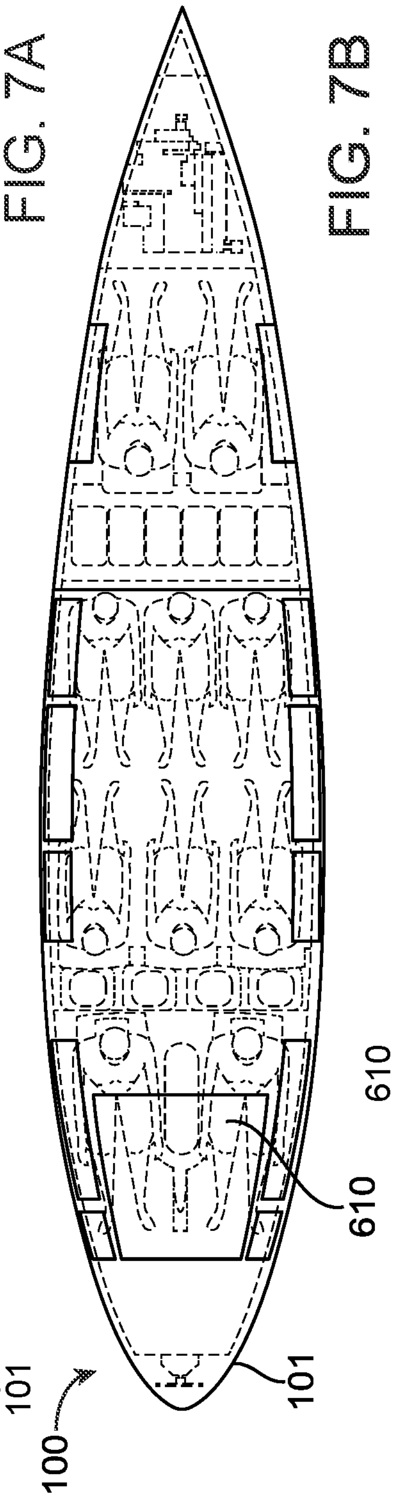
Figure 7C:
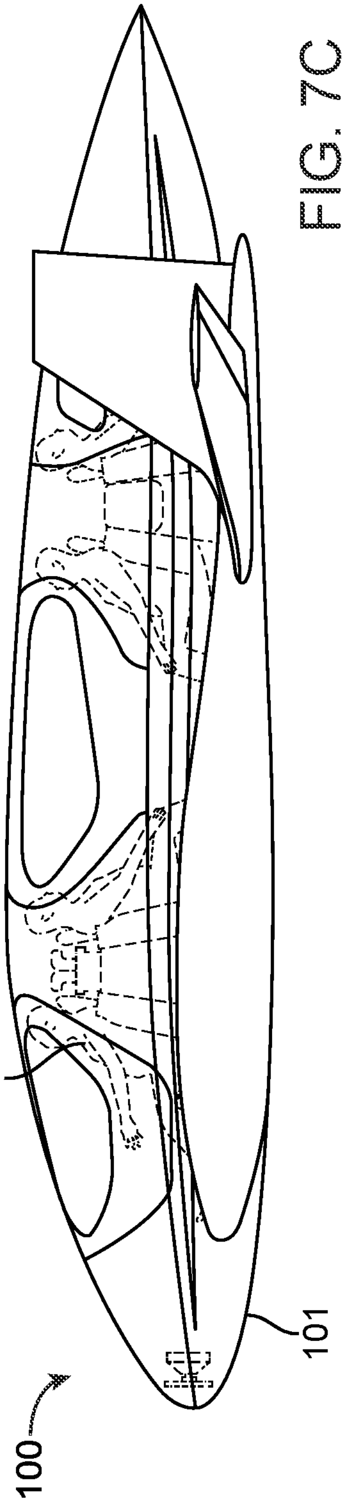
Figure 7D:
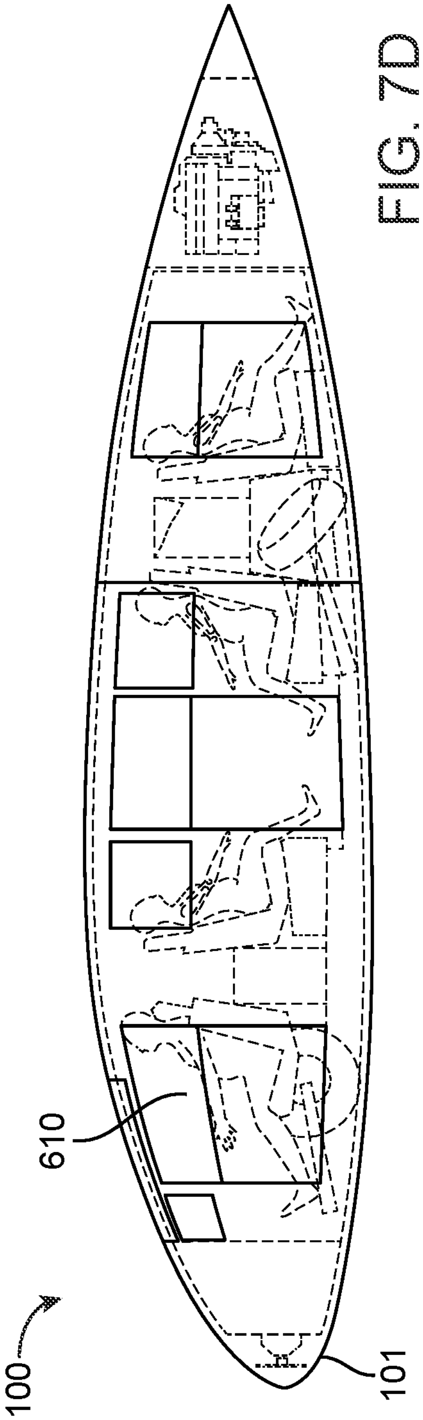
Figure 7E:
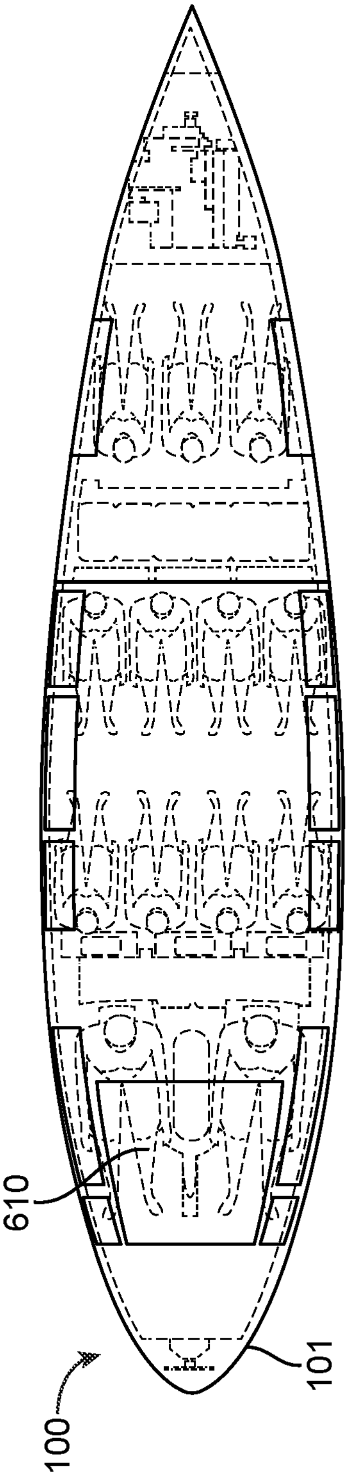

FIGS. 6A to 6C illustrate various top and side views of the fuselage 101 of the aircraft 100 configured to carry passengers 610 and cargo 620 according to some embodiment. As shown in FIGS. 6A to 6C, the aircraft 100 may include one or more passengers 610 located at the front of the fuselage 101 with the cargo 620 located behind the passengers 610.

FIGS. 7A to 7E illustrate top and side views of the fuselage 101 of the aircraft 100 configured to carry passengers 610 according to one embodiment. In the example shown herein shown, two pilots are situated in the front of the fuselage 101 with a security divider separating the passenger cabin. Passengers 610 sit in two compartments in one embodiment. The first compartment features club seating, where larger passengers can sit in the row closest to the pilots for improved weight and balance across layouts. The aft facing seats enabled by club seating naturally encourages improved security for the pilots.

The aft cabin compartment features seating for two passengers facing aft in one embodiment. A wide-view window may be situated at the aft end of the fuselage 101 for improved visibility from these seats.

A 5-passenger configuration that is similar to the passenger configuration shown in the figures, except that the aft passenger cabin is removed, the two club rows can support two seats each, and the pilot compartment can only support a single pilot. The 9-passenger configuration can be reconfigured to support 12 seats of smaller individuals (i.e., a family that may want to fly as a unit). Each row of passenger seat backs can fold down to reveal compartments for baggage. These seat backs may be folded down in flight to allow for larger baggage to be transported, potentially for an additional fee.

Reference in the specification to "one embodiment" or to "an embodiment" means that a particular feature, structure, or characteristic is included in at least one embodiment of the disclosure. The appearances of the phrase "in one embodiment" in various places in the specification are not necessarily referring to the same embodiment.

While the disclosure has been particularly shown and described with reference to one embodiment and several alternate embodiments, it will be understood by persons skilled in the relevant art that various changes in form and details can be made therein without departing from the spirit and scope of the invention.

What is claimed is:

1. A ducted wing configured to be attached to an aircraft, the ducted wing comprising:

a plurality of ducted fans that are integrated into a leading edge of the ducted wing and that are each connected to at least one other ducted fan of the plurality of ducted fans to collectively form the ducted wing, wherein each ducted fan forms a duct between an upper portion and a lower wing portion of the ducted fan, each ducted fan including:

an upper wing portion that is connected to an upper wing portion of an adjacent ducted fan of the plurality of ducted fans and having a first leading edge, a trailing edge that is opposite the first leading edge of the upper wing portion, an outer surface between the first leading edge and the trailing edge of the upper wing portion, and an inner surface opposite the outer surface of the upper wing portion and between the first leading edge and the trailing edge of the upper wing portion;

a lower wing portion that comprises a portion of the leading edge of the ducted wing and having a second leading edge, a trailing edge that is opposite the second leading edge of the lower wing portion and extends past the trailing edge of the upper wing portion, an outer surface between the second leading edge and the trailing edge of the lower wing portion, and an inner surface that extends from the inner surface of the upper wing portion to form the duct in the ducted fan, the duct extending from the first leading edge of the upper wing portion and the second leading edge of the lower wing portion to the trailing edge of the upper wing portion and an intermediate portion of the lower wing portion that is between the second leading edge and the trailing edge of the lower wing portion; and a propulsor fan in the duct of the ducted fan, the propulsor fan disposed between the upper wing portion and the lower wing portion, the propulsor fan closer to the first leading edge of the upper wing portion and the second leading edge of the lower wing portion than the trailing edge of the upper wing portion;

wherein a diameter of the duct changes from the first leading edge of the upper wing portion and the second leading edge of the lower wing portion to the trailing edge of the upper wing portion and the intermediate portion of the lower wing portion; and wherein each propulsor fan of the plurality of ducted fans is canted at a non-zero angle relative to a chord line of the lower wing portion of the ducted fan.

2. The ducted wing of claim 1, wherein the trailing edge of the upper wing portion comprises a first flap configured to vary a diameter of an outlet of the duct defined between the trailing edge of the upper wing portion and the intermediate portion of the lower wing portion.

3. The ducted wing of claim 2, wherein the first flap is configured to vary the diameter of the outlet of the duct by pivoting between a first position corresponding to a first angle of the first flap and a second position of the first flap corresponding to a second angle that is greater than the first angle.

4. The ducted wing of claim 2, wherein the trailing edge of the lower wing portion includes a second flap configured to pivot between a first position corresponding to a first angle of the second flap that is associated with a conventional takeoff and landing mode of the aircraft, a second position corresponding to a second angle of the second flap that is greater than the first angle of the second flap and associated with a vertical takeoff and landing mode of the aircraft, and a third position corresponding to a third angle of the second flap that is between the first angle and the second angle of the second flap and associated with a short takeoff and landing mode of the aircraft.

5. The ducted wing of claim 4, wherein at least one of the first leading edge of the upper wing portion or the second leading edge of the lower wing portion respectively includes at least one flap that is configured to vary a diameter of an inlet of the duct defined between the first leading edge of the upper wing portion and the second leading edge of the lower wing portion.

6. The ducted wing of claim 5, wherein each of the at least one flap is configured to vary the diameter of the inlet of the duct by pivoting between a first position corresponding to a first angle of the at least one flap and a second position of the at least one flap that corresponds to a second angle that is greater than the first angle of the at least one flap.

7. The ducted wing of claim 1, wherein the first leading edge of the upper wing portion extends past the second leading edge of the lower wing portion such that the first leading edge of the upper wing portion is non-overlapping with the second leading edge of the lower wing portion.

8. The ducted wing of claim 1, wherein the outer surface of the upper wing portion is convex between the first leading edge and the trailing edge of the upper wing portion, and the inner surface of the upper wing portion is concave between the first leading edge and the trailing edge of the upper wing portion.

9. The ducted wing of claim 8, wherein a thickness of the upper wing portion increases from the first leading edge of the upper wing portion to an intermediate portion of the upper wing portion that is between the first leading edge and the trailing edge of the upper wing portion, and the thickness of the upper wing portion decreases from the intermediate portion to the trailing edge of the upper wing portion.

10. The ducted wing of claim 9, wherein the outer surface of the lower wing portion is convex between the second leading edge and the trailing edge of the lower wing portion, and a first portion of the inner surface of the lower wing portion is concave between the second leading edge of the lower wing portion and the intermediate portion of the lower wing portion, and a second portion of the inner surface of the lower wing portion is convex between the intermediate portion of the lower wing portion and the trailing edge of the lower wing portion.

11. The ducted wing of claim 10, wherein a thickness of the lower wing portion increases from the second leading edge of the lower wing portion to the intermediate portion of the lower wing portion, and the thickness of the lower wing portion decreases from the intermediate portion of the lower wing portion to the trailing edge of the lower wing portion.

12. The ducted wing of claim 11, wherein the intermediate portion of the lower wing portion is aligned with the trailing edge of the upper wing portion.

13. An aircraft comprising:

a fuselage;

a plurality of ducted wings connected to the fuselage, each of the ducted wings including an integrated array of ducted fans configured to generate thrust;

a plurality of booms, each boom attached to an end of a corresponding ducted wing from the plurality of ducted wings; and a plurality of horizontal tails, each horizontal tail connected to an end of a corresponding one of the booms from the plurality of booms;

wherein each ducted fan of the integrated array of ducted fans forms a duct between an upper wing portion and a lower wing portion of the ducted fan, and each ducted fan comprises:

an upper wing portion that is connected to an upper wing portion of an adjacent ducted fan of the integrated array of ducted fans having a first leading edge, a trailing edge that is opposite the first leading edge of the upper wing portion, an outer surface between the first leading edge and the trailing edge of the upper wing portion, and an inner surface opposite the outer surface of the upper wing portion and between the first leading edge and the trailing edge of the upper wing portion;

a lower wing portion that comprises a portion of a leading edge of the ducted wing and having a second leading edge, a trailing edge that is opposite the second leading edge of the lower wing portion and extends past the trailing edge of the upper wing portion, an outer surface between the second leading edge and the trailing edge of the lower wing portion, and an inner surface that extends from the inner surface of the upper wing portion to form the duct in the ducted fan, the duct extending from the first leading edge of the upper wing portion and the second leading edge of the lower wing portion to the trailing edge of the upper wing portion and an intermediate portion of the lower wing portion that is between the second leading edge and the trailing edge of the lower wing portion; and a propulsor fan in the duct of the ducted fan, the propulsor fan disposed between the upper wing portion and the lower wing portion, the propulsor fan closer to the first leading edge of the upper wing portion and the second leading edge of the lower wing portion than the trailing edge of the upper wing portion;

wherein a diameter of the duct changes from the leading edge of the upper wing portion and the second leading edge of the lower wing portion to the trailing edge of the upper wing portion and the intermediate portion of the lower wing portion.

14. The aircraft of claim 13, further comprising:

a plurality of vertical tails, each vertical tail connected to the end of a corresponding one of the booms from the plurality of booms.

15. The aircraft of claim 13, wherein the trailing edge of the upper wing portion comprises a first flap configured to vary a diameter of an outlet of the duct defined between the trailing edge of the upper wing portion and the intermediate portion of the lower wing portion.

16. The aircraft of claim 15, wherein the first flap is configured to vary the diameter of the outlet of the duct by pivoting between a first position corresponding to a first angle of the first flap and a second position of the first flap corresponding to a second angle that is greater than the first angle.

17. The aircraft of claim 15, wherein the trailing edge of the lower wing portion includes a second flap configured to pivot between a first position corresponding to a first angle of the second flap that is associated with a conventional takeoff and landing mode of the aircraft, a second position corresponding to a second angle of the second flap that is greater than the first angle of the second flap and associated with a vertical takeoff and landing mode of the aircraft, and a third position corresponding to a third angle of the second flap that is between the first angle and the second angle of the second flap and associated with a short takeoff and landing mode of the aircraft.

18. The aircraft of claim 17, wherein at least one of the first leading edge of the upper wing portion or the second leading edge of the lower wing portion respectively includes at least one flap that is configured to vary a diameter of an inlet of the duct defined between the first leading edge of the upper wing portion and the second leading edge of the lower wing portion.

19. The aircraft of claim 18, wherein each of the at least one flap is configured to vary the diameter of the inlet of the duct by pivoting between a first position corresponding to a first angle of the at least one flap and a second position of the at least one flap that corresponds to a second angle that is greater than the first angle of the at least one flap.

20. The aircraft of claim 13, wherein the first leading edge of the upper wing portion extends past the second leading edge of the lower wing portion such that the first leading edge of the upper wing portion is non-overlapping with the second leading edge of the lower wing portion.

21. The aircraft of claim 13, wherein the outer surface of the upper wing portion is convex between the first leading edge and the trailing edge of the upper wing portion, and the inner surface of the upper wing portion is concave between the first leading edge and the trailing edge of the upper wing portion.

22. The aircraft of claim 21, wherein a thickness of the upper wing portion increases from the first leading edge of the upper wing portion to an intermediate portion of the upper wing portion that is between the first leading edge and the trailing edge of the upper wing portion, and the thickness of the upper wing portion decreases from the intermediate portion to the trailing edge of the upper wing portion.

23. The aircraft of claim 22, wherein the outer surface of the lower wing portion is convex between the second leading edge and the trailing edge of the lower wing portion, and a first portion of the inner surface of the lower wing portion is concave between the second leading edge of the lower wing portion and the intermediate portion of the lower wing portion, and a second portion of the inner surface of the lower wing portion is convex between the intermediate portion of the lower wing portion and the trailing edge of the lower wing portion.

24. The aircraft of claim 23, wherein a thickness of the lower wing portion increases from the second leading edge of the lower wing portion to the intermediate portion of the lower wing portion, and the thickness of the lower wing portion decreases from the intermediate portion of the lower wing portion to the trailing edge of the lower wing portion.

25. The aircraft of claim 24, wherein the intermediate portion of the lower wing portion is aligned with the trailing edge of the upper wing portion.

* * * * *